US011289089B1

(12) United States Patent
Singh et al.

(10) Patent No.: US 11,289,089 B1
(45) Date of Patent: Mar. 29, 2022

(54) AUDIO BASED PROJECTOR CONTROL

(71) Applicant: Amazon Technologies, Inc., Seattle, WA (US)

(72) Inventors: Bijendra Singh, Cedar Park, TX (US); Dawit Teshome Habtegiorgis, Austin, TX (US); Satya Ranganathan, Austin, TX (US); Saadiah Gul Ahmed, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 83 days.

(21) Appl. No.: 16/909,408

(22) Filed: Jun. 23, 2020

(51) Int. Cl.
| | |
|---|---|
| *G10L 15/22* | (2006.01) |
| *G10L 25/78* | (2013.01) |
| *H04N 9/31* | (2006.01) |
| *H04R 1/40* | (2006.01) |

(52) U.S. Cl.
CPC .............. *G10L 15/22* (2013.01); *G10L 25/78* (2013.01); *H04N 9/3194* (2013.01); *H04R 1/406* (2013.01); *G10L 2025/783* (2013.01)

(58) Field of Classification Search
CPC ... G10L 15/22; G10L 25/78; G10L 2025/783; H04N 9/3194; H04R 1/406
See application file for complete search history.

(56) References Cited

U.S. PATENT DOCUMENTS

| 9,075,435 | B1* | 7/2015 | Noble | H04M 1/72454 |
|---|---|---|---|---|
| 9,185,563 | B2* | 11/2015 | Asakawa | G06F 21/88 |
| 9,197,974 | B1* | 11/2015 | Clark | H04R 29/004 |
| 9,293,151 | B2* | 3/2016 | Herbig | G10L 25/27 |
| 9,942,513 | B1* | 4/2018 | Aarrestad | H04N 7/142 |
| 10,356,362 | B1* | 7/2019 | Rudberg | H04N 7/15 |
| 10,516,939 | B1* | 12/2019 | Liu | H04R 1/403 |
| 10,819,920 | B1* | 10/2020 | Hamlin | G06F 1/1618 |
| 10,824,921 | B2* | 11/2020 | Bathiche | G06K 9/6289 |
| 2014/0282273 | A1* | 9/2014 | Anderson | G06F 3/017 |
| | | | | 715/863 |
| 2014/0337016 | A1* | 11/2014 | Herbig | H04M 3/568 |
| | | | | 704/201 |
| 2015/0331490 | A1* | 11/2015 | Yamada | G10L 25/78 |
| | | | | 345/156 |
| 2016/0327299 | A1* | 11/2016 | Ribbich | F24F 11/30 |
| 2017/0234562 | A1* | 8/2017 | Ribbich | G05D 23/1923 |
| | | | | 700/277 |

(Continued)

*Primary Examiner* — Mohammad K Islam
(74) *Attorney, Agent, or Firm* — Pierce Atwood LLP

(57) ABSTRACT

This disclosure proposes systems and methods to perform audio based projector control by a projector device to detect that a user is close to a projector and disable the projector when certain conditions are detected. The projector device may detect the user by performing voice activity detection (VAD) and/or breathing activity detection (BAD) on reference audio data generated by a reference microphone by the projector. In some examples, the projector device may determine that the user is located near the projector by performing beamforming on input audio data and/or comparing a first signal strength of the reference audio data to a second signal strength of the input audio data. The projector device may also implement two level device peripheral control architecture to provide additional safeguards to ensure that control mechanisms are in place even if a central processing unit (CPU) stops operating normally.

20 Claims, 23 Drawing Sheets

(56) References Cited

U.S. PATENT DOCUMENTS

| | | | | |
|---|---|---|---|---|
| 2018/0007210 A1* | 1/2018 | Todasco | ............ | H04M 3/53366 |
| 2018/0048874 A1* | 2/2018 | Esrail | .................. | H04N 9/3141 |
| 2018/0233145 A1* | 8/2018 | Bathiche | ............ | G06K 9/00369 |
| 2019/0005042 A1* | 1/2019 | Pushparaja | .............. | G06F 3/011 |
| 2019/0311718 A1* | 10/2019 | Huber | ..................... | G06F 3/013 |
| 2020/0279561 A1* | 9/2020 | Sheeder | .................. | G06F 3/013 |
| 2020/0294042 A1* | 9/2020 | Day | ....................... | G06Q 20/20 |
| 2021/0065732 A1* | 3/2021 | Park | ........................ | G10L 15/22 |
| 2021/0158809 A1* | 5/2021 | VanBlon | ................. | G06F 3/017 |
| 2021/0312920 A1* | 10/2021 | Stahl | ................... | H04R 1/1083 |

* cited by examiner

FIG. 1
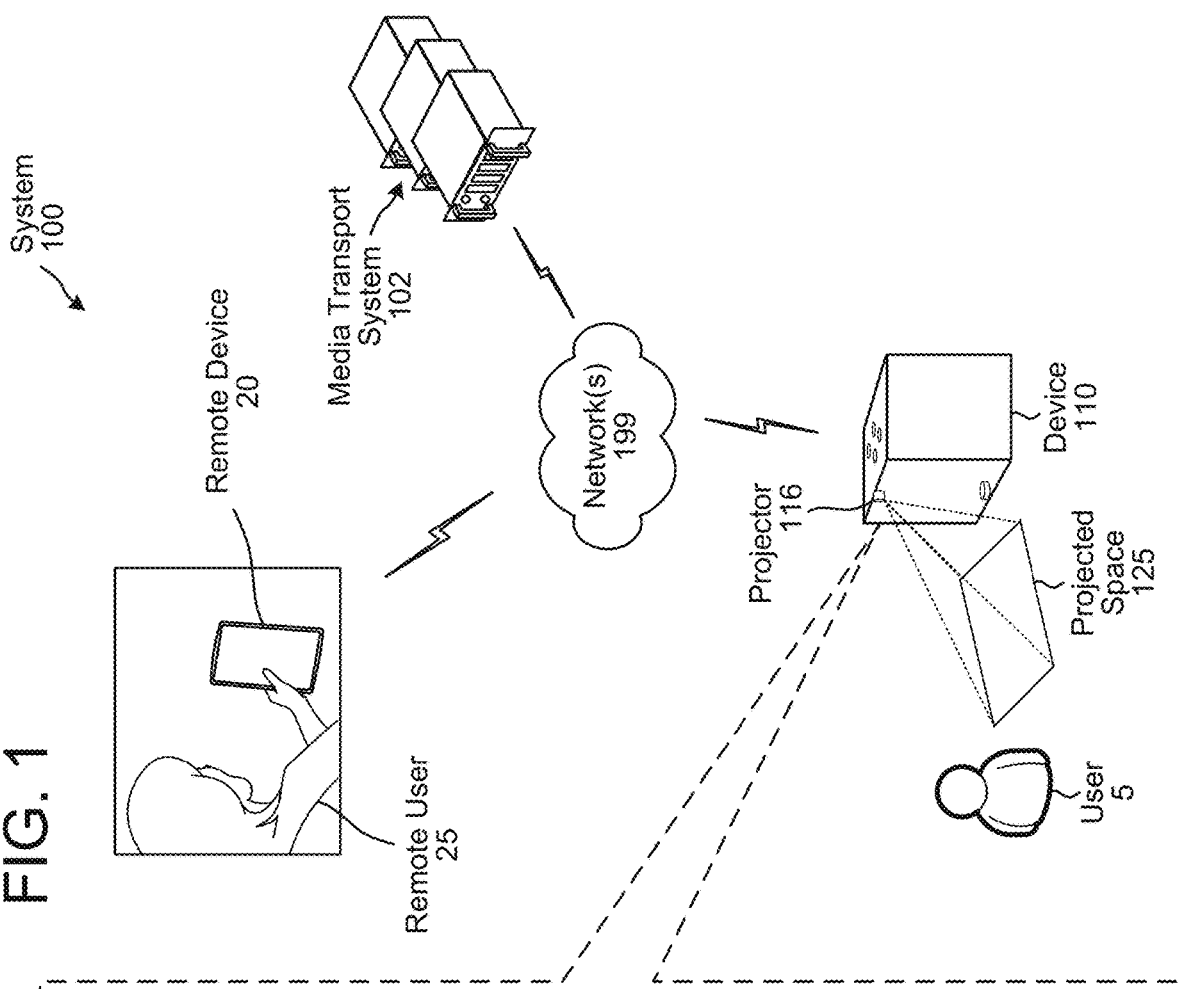
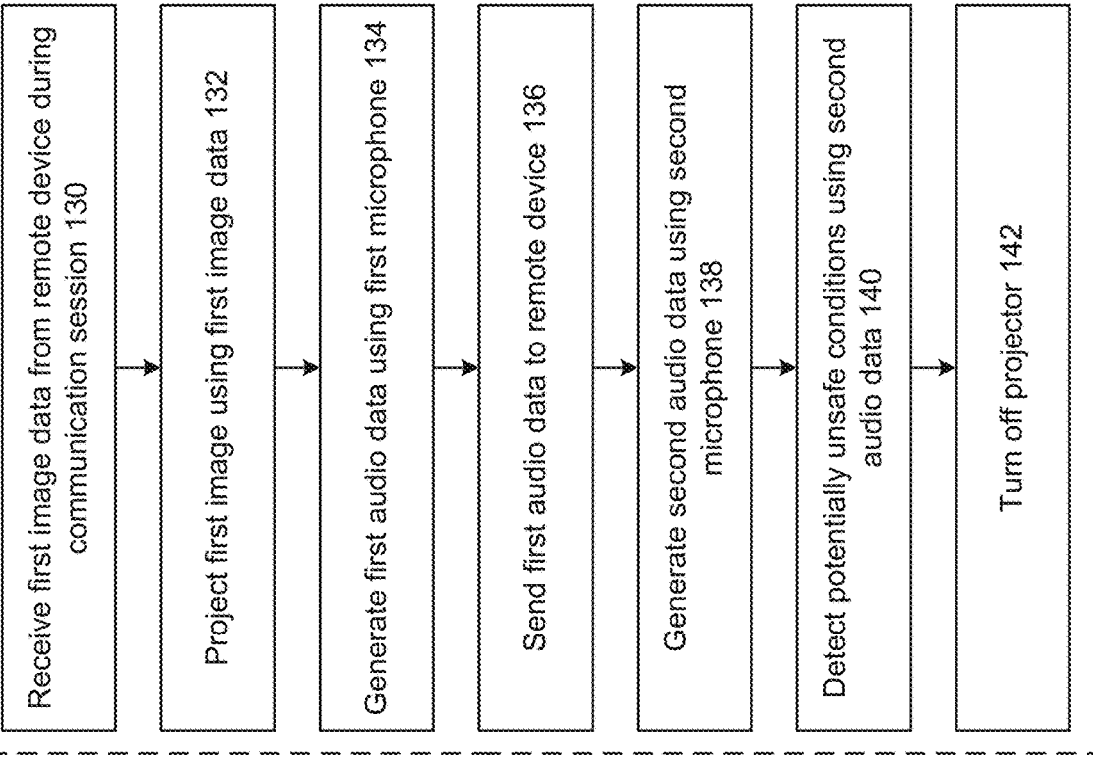

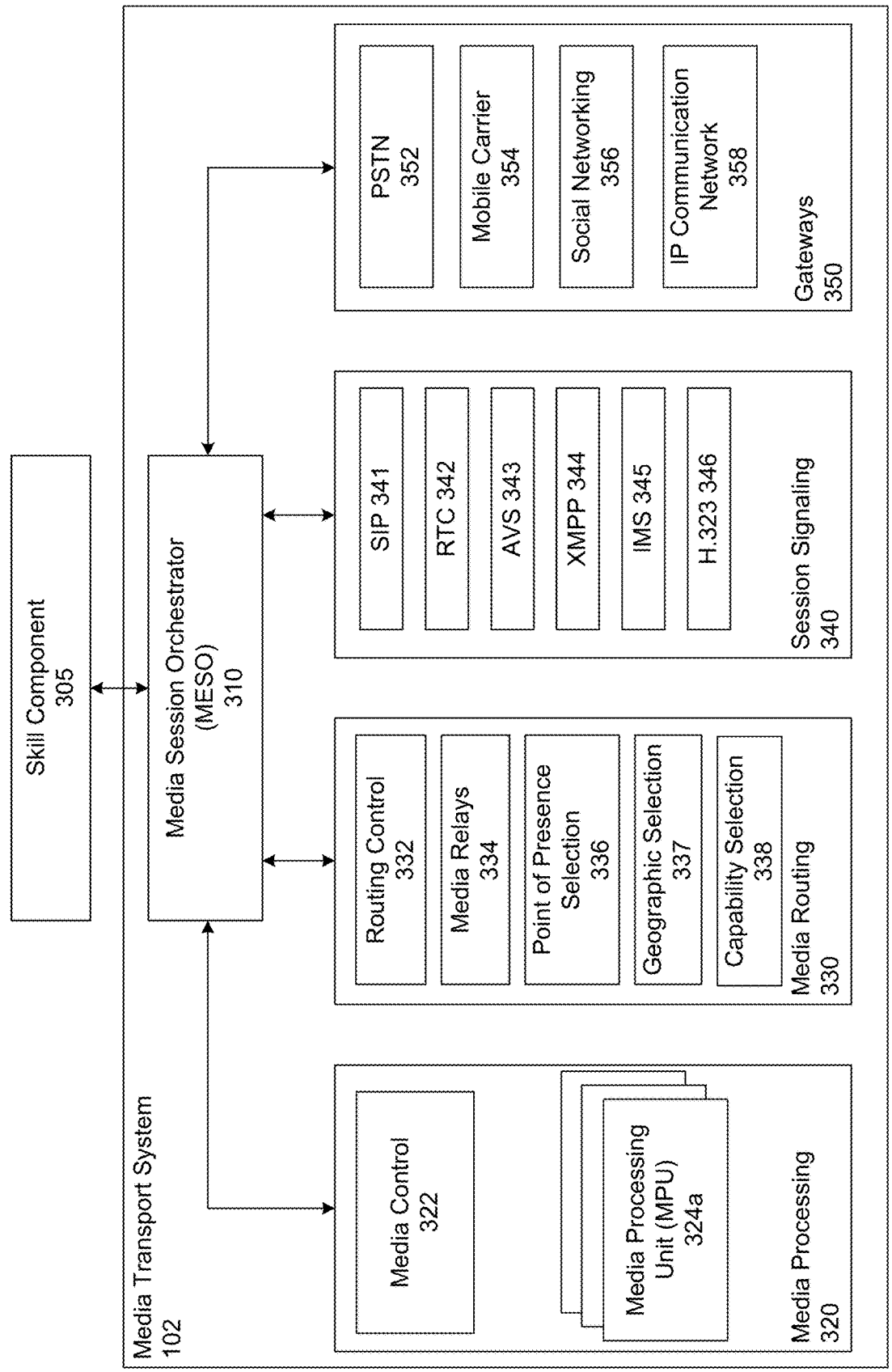

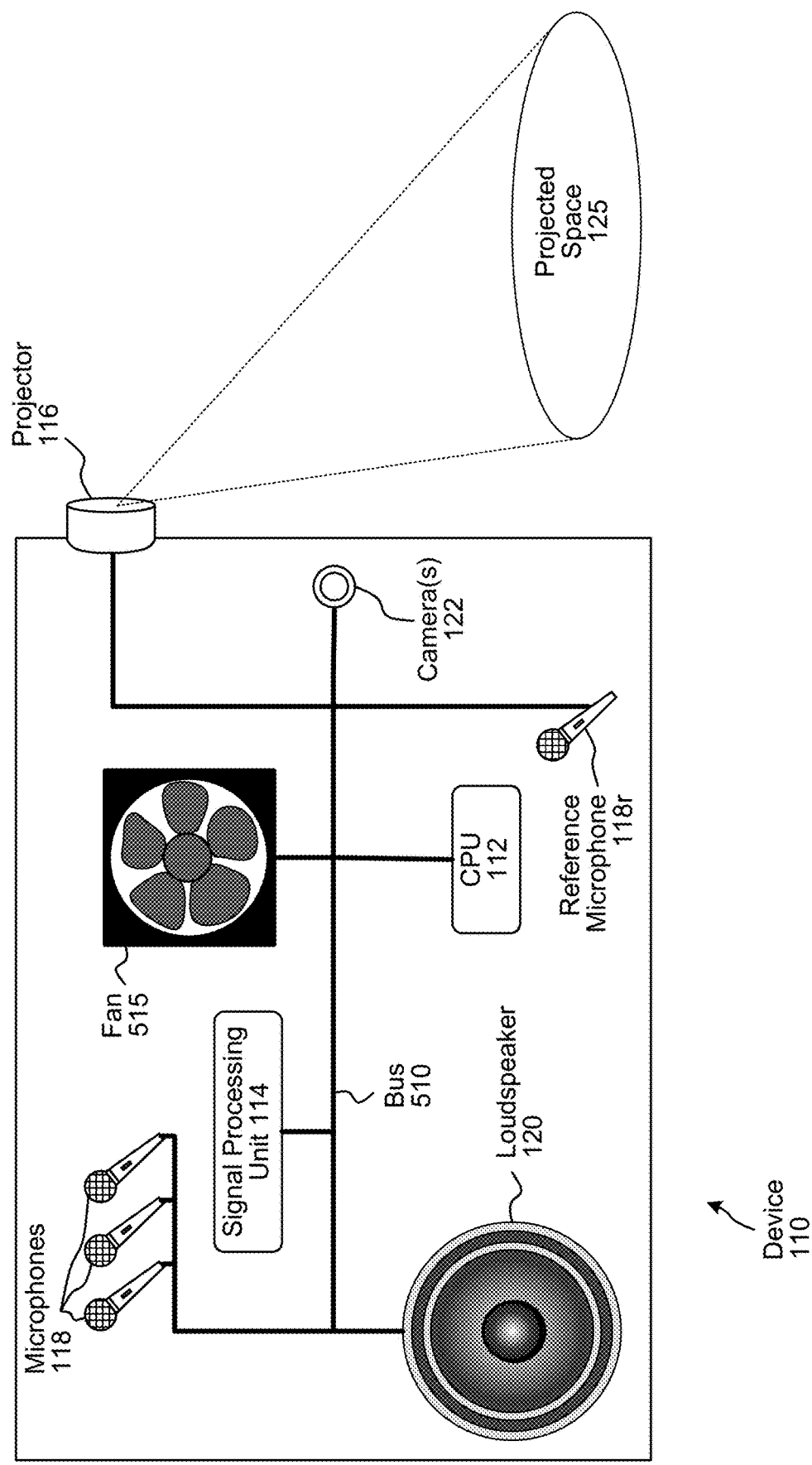

FIG. 7
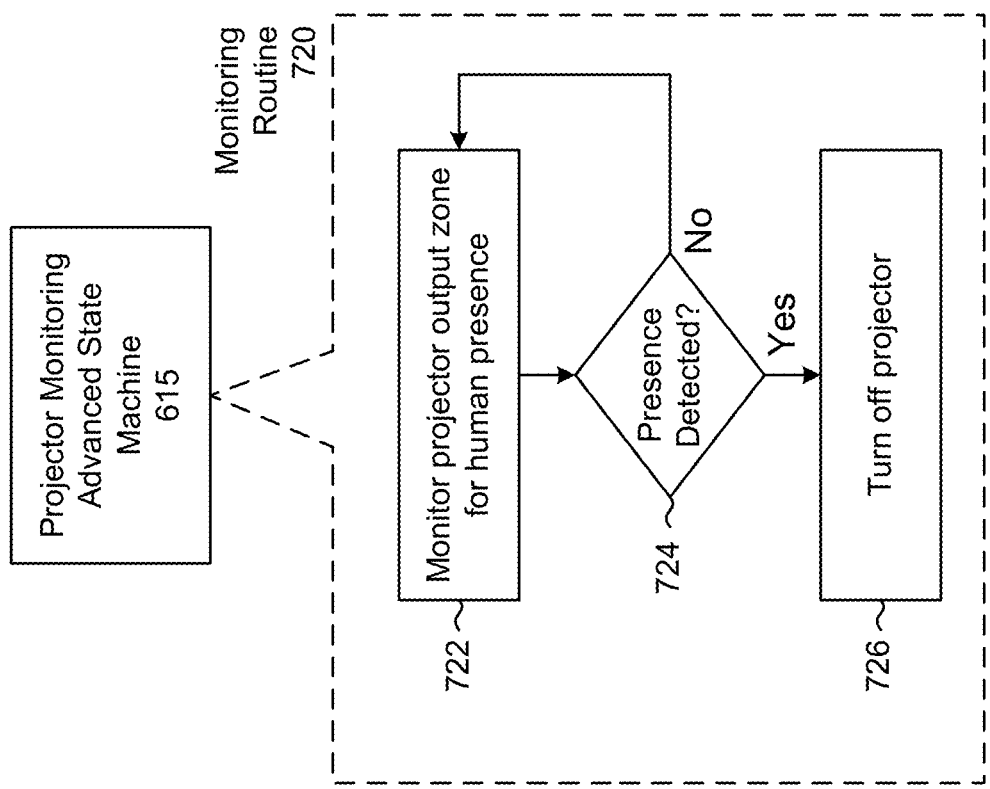
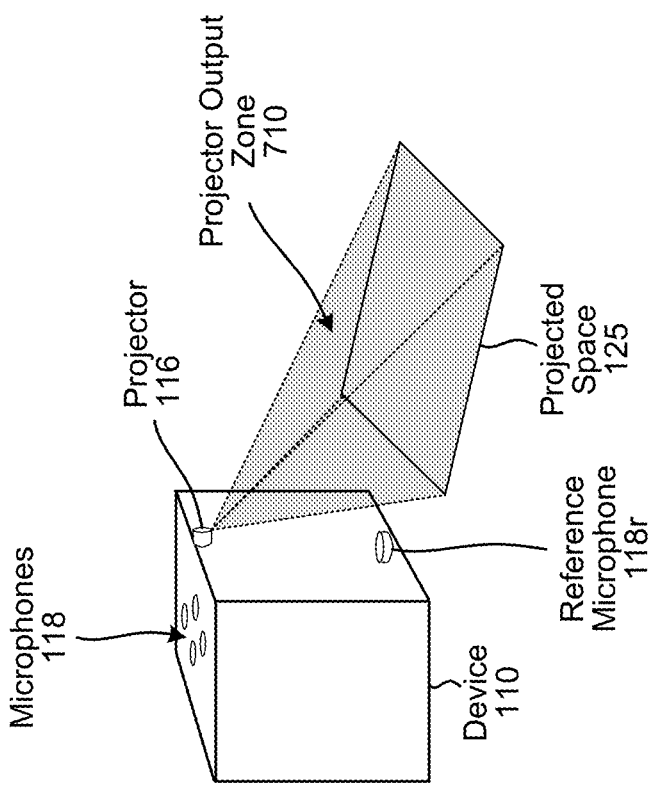

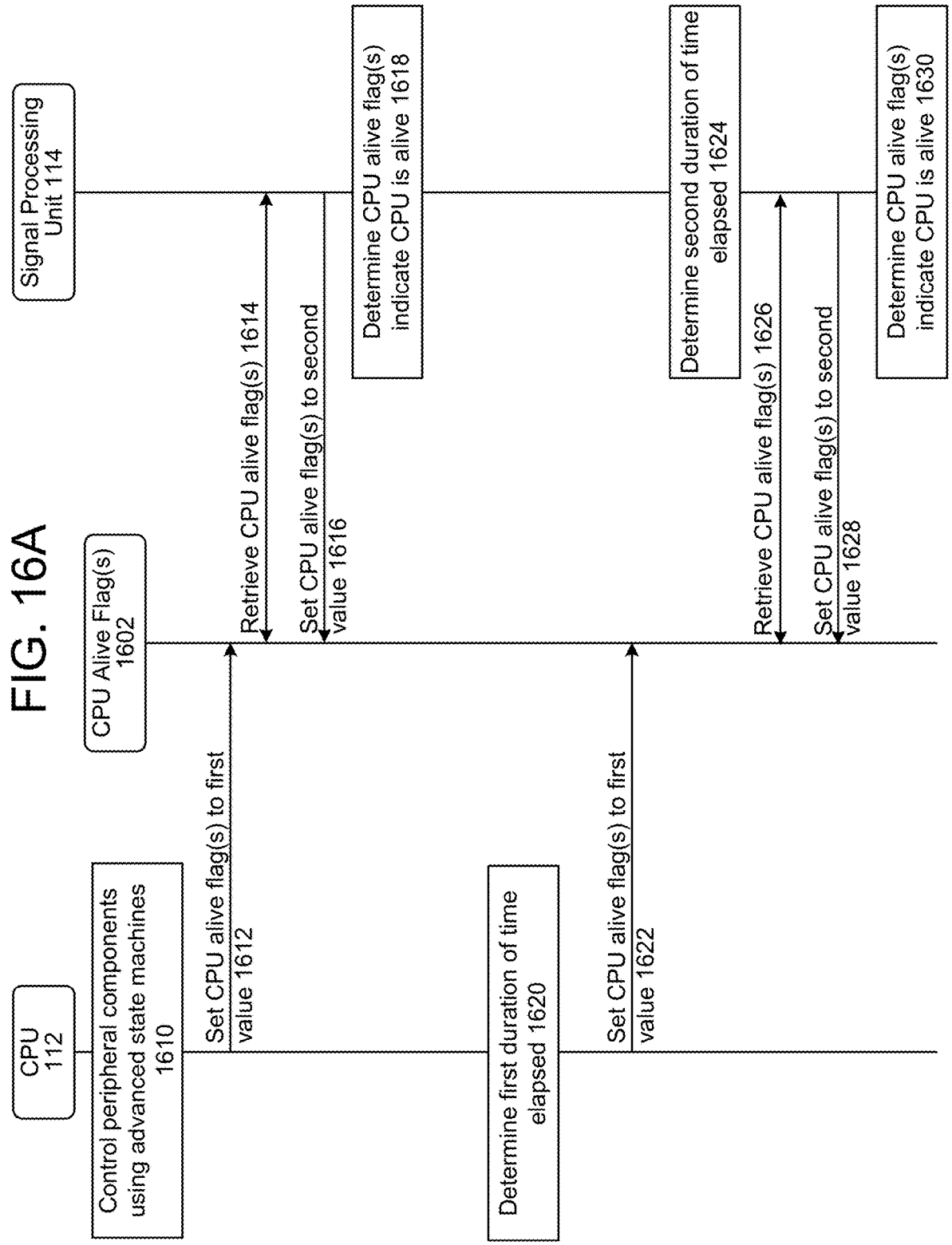

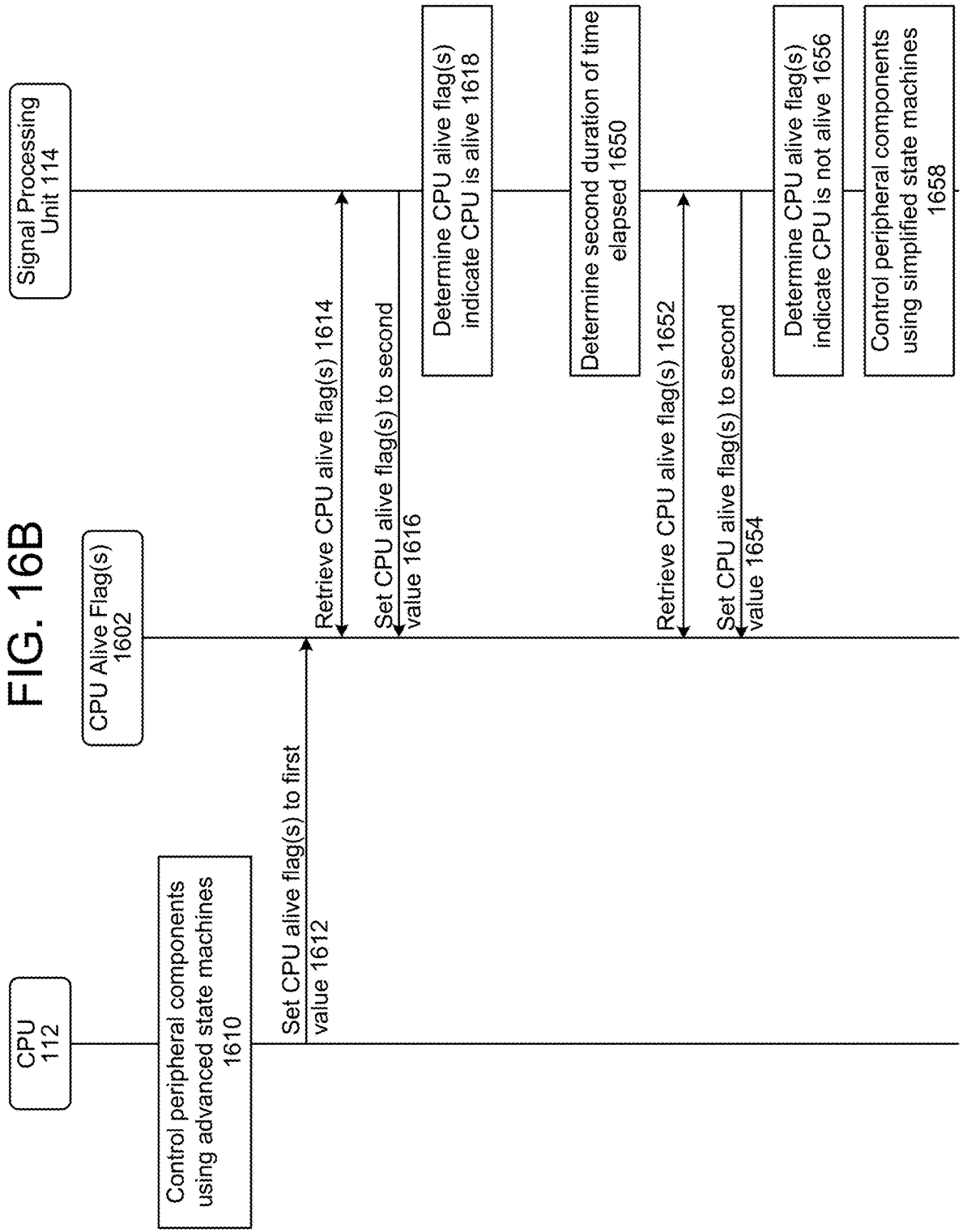

AUDIO BASED PROJECTOR CONTROL

BACKGROUND

With the advancement of technology, the use and popularity of electronic devices has increased considerably. Electronic devices are commonly used to capture and send audio data and/or image data.

BRIEF DESCRIPTION OF DRAWINGS

For a more complete understanding of the present disclosure, reference is now made to the following description taken in conjunction with the accompanying drawings.

FIG. 1 illustrates a conceptual diagram of a system configured with audio based projector control according to embodiments of the present disclosure.

FIGS. 3A-3B illustrate example component diagrams of a media transport system configured to perform media processing according to embodiments of the present disclosure.

FIG. 5 illustrates a schematic diagram of an example device implementing audio based projector control according to embodiments of the present disclosure.

FIG. 7 illustrates an example of projector monitoring according to embodiments of the present disclosure.

FIGS. 16A-16B are communication diagrams conceptually illustrating example methods for controlling peripheral components using a CPU component when the CPU component is operating normally and controlling the peripheral components using a signal processor when the CPU component is not operating normally according to embodiments of the present disclosure.

DETAILED DESCRIPTION

Figure 2:
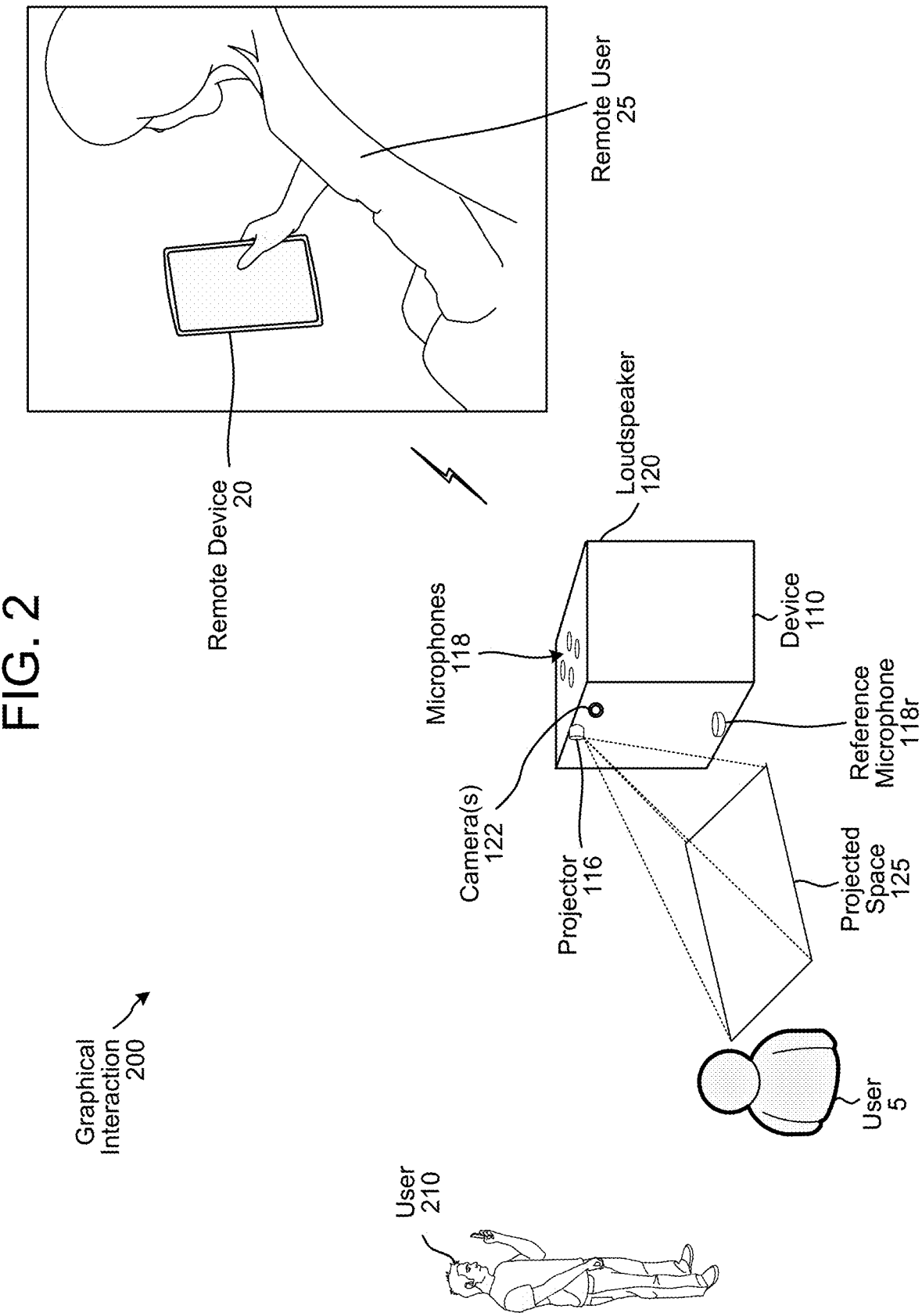
FIG. 2 illustrates an example of a graphical interaction example using a shared projected space according to embodiments of the present disclosure.

Electronic devices are commonly used to interact with a user by capturing audio data, image data, and/or other input data. Electronic devices may capture the audio data, image data, and/or other input data during a communication session and may provide additional functionality using a projector. For example, a projector device may project an image to enable a graphical interaction between a local user and a remote user during the communication session. Described herein is, among other things, new technology directed to enabling audio based projector control processing to turn off a projector of the projector device when certain conditions are detected.

To improve a user experience with a projector device, this disclosure includes a system that implements audio based projector control to detect that a user is close to a projector and disable the projector when certain conditions are detected. The system may detect the user by performing voice activity detection (VAD) and/or breathing activity detection (BAD) on reference audio data generated by a reference microphone located near the projector. In some examples, the projector device may determine that the user is located near the projector by performing beamforming on input audio data and/or comparing a first signal strength of the reference audio data to a second signal strength of the input audio data.

In addition, the system may implement two level device peripheral control enforcement architecture. The two level control enforcement architecture offers double fault protection, providing additional safeguards to ensure that control mechanisms (such as turning off or reducing the output of peripheral components) are in place even if the CPU stops operating normally. For example, a device may control peripheral components (e.g., fan components, projector, microphones, loudspeaker, etc.) using primary state machines running on the CPU and secondary state machines running on a signal processing unit. The CPU may control the peripheral components using the primary state machines during normal operation, but if the signal processing unit determines that the CPU is no longer operating normally then the signal processing unit may control the peripheral component using the secondary state machines.

FIG. 1 illustrates a conceptual diagram of a system configured with audio based projector control according to embodiments of the present disclosure. Although the figures and discussion of the present disclosure illustrate certain operational steps of the system in a particular order, the steps described may be performed in a different order (as well as certain steps removed or added) without departing from the intent of the disclosure. As shown in FIG. 1, a device 110 may be local to a user 5 and may include a projector 116 configured to interact with the user 5 via a projected space 125. In addition, the device 110 may be part of a broader system 100, which may include a remote device 20 associated with a remote user 25.

As illustrated in FIG. 1, the device 110 and the remote device 20 may be connected across one or more network(s) 199. In some examples, the device 110 and the remote device 20 may communicate using a media transport system 102, described in greater detail below with regard to FIGS. 3A-4B. Thus, the device 110 and the remote device 20 may send and receive audio data, image data, and/or the like via the network(s) 199 and/or the media transport system 102. For example, the remote device 20 may generate first image data representing the remote user 25 and/or first audio data representing utterances generated by the remote user 25 and may send the first image data and/or the first audio data to the device 110 via the network(s) 199. The device 110 may output first audio corresponding to the first audio data using at least one loudspeaker 120 (illustrated in FIG. 2) and/or may display a first image corresponding to the first image data using a display (not illustrated) and/or the projector 116. However, the disclosure is not limited thereto and the device 110 may not display the image and/or output the audio without departing from the disclosure.

Similarly, the device 110 may generate second image data representing the user 5 using one or more camera(s) 122 (illustrated in FIG. 2) and/or generate second audio data representing utterances generated by the user 5 using microphones 118 (illustrated in FIG. 2) and may send the second image data and/or the second audio data to the remote device 20 via the network(s) 199. The remote device 20 may output second audio corresponding to the second audio data and/or may display a second image corresponding to the second image data using a display. However, the disclosure is not limited thereto and the device 110 may not generate the second audio data and/or the second image data without departing from the disclosure.

FIG. 2 illustrates an example of a graphical interaction using a shared projected space according to embodiments of the present disclosure. As illustrated in FIG. 2, the system 100 may enable a graphical interaction 200 between the user 5 and the remote user 25 within a projected space 125.

In some examples, the remote device 20 may generate a user interface that enables the remote user 25 to input graphical data to the remote device 20. For example, the remote device 20 may enable the remote user 25 to draw using a touchscreen of the remote device 20 and/or other input components, although the disclosure is not limited thereto. The remote device 20 may send the graphical data to the device 110 and the device 110 may generate a third image based on the graphical data. For example, the device 110 may project at least a portion of the graphical data onto the projected space 125 using the projector 116. This enables the user 5 to interact with the graphical data within the projected space 125. For example, the user 5 may draw on paper positioned across the projected space 125, with the graphical data being represented on the paper by the projector 116. Thus, the user 5 and the remote user 25 may collaborate on a drawing, play a game, and/or the like within the projected space 125 without departing from the disclosure.

In some examples, the second image data represents at least a portion of the projected space 125, such that the remote device 20 may display the portion of the projected space 125 to the remote user 25. For example, a first camera 122a of the device 110 may capture the second image data representing the user 5 and the projected space 125. However, the disclosure is not limited thereto, and in some examples the device 110 may generate third image data representing the projected space 125 using a second camera 122b. For example, the first camera 122a may capture the second image data representing the user 5 and the second camera 122b may capture the third image data representing the projected space 125 without departing from the disclosure. Thus, the device 110 may include a first camera 122a configured to capture the user 5, a second camera 122b configured to capture the projected space 125, and/or additional camera(s) 122 without departing from the disclosure. In some examples, the device 110 may include a specialized camera 122, such as an infrared (IR) image sensor, to monitor the projected space 125 without departing from the disclosure.

As illustrated in FIG. 2, the device 110 may include at least one loudspeaker 120 that is configured to generate output audio for the user 5. For example, the loudspeaker 120 may generate first audio corresponding to the first audio data received from the remote device 20 using at least one loudspeaker 120. However, the disclosure is not limited thereto and the device 110 may include two or more loudspeakers 120 without departing from the disclosure. In addition, FIG. 2 is intended to conceptually illustrate an example of the device 110 and is not intended to illustrate a specific location of the loudspeaker 120 on the device 110. Thus, location(s) of one or more loudspeaker(s) 120 may vary without departing from the disclosure.

While FIG. 2 does not illustrate an example of a display, the device 110 may include one or more displays configured to generate an output image for the user 5. For example, the device 110 may include a display near the projector 116 that is configured to generate an output image representing the remote user 25 without departing from the disclosure. Thus, the device 110 may enable the graphical interaction 200 between the user 5 and the remote user 25 within the projected space 125 while also enabling a video interaction between the user 5 and the remote user 25 using the display. The disclosure is not limited thereto, however, and in some examples the device 110 may generate the output image representing the remote user 25 within the projected space 125 without departing from the disclosure.

Using the audio data, image data, graphical data, and/or the like sent and received between the device 110 and the remote device 20, the system 100 may enable the user 5 and the remote user 25 to see and/or hear each other while also interacting with each other within the projected space 125. Thus, the system 100 may be configured to provide greater functionality during a communication session, enabling the user 5 to interact with the remote user 25 in new and creative ways.

As illustrated in FIG. 2, in some examples a second user 210 local to the device 110 may facilitate the communication session for the user 5. For example, if the user 5 is a child, the user 210 may be a local caregiver (e.g., parent) that sets up and/or authorizes the communication session, such as by using a smart phone or other mobile device. However, the disclosure is not limited thereto and the device 110 may be configured to initiate and/or configure the communication session independently from a mobile device.

To protect the user 5 during the communication session, the device 110 may implement safeguards to reduce potential concerns associated with the device 110 and/or components of the device 110. For example, the device 110 may be configured to detect unsafe conditions in which the projector 116 may shine a bright light in the user's face and may turn off the projector as a precaution, although the disclosure is not limited thereto.

In some examples, the device 110 may include a signal processing unit 114 configured to perform audio based projector control processing to disable (e.g., turn off) the projector 116 when certain conditions are present. To illustrate an example, the signal processing unit 114 may detect that the user 5 is in the projected space 125 and may turn off the projector 116 when appropriate to avoid the projector 116 shining a bright light into the user's face. For example, the signal processing unit 114 may use input audio data to detect when certain conditions are present, which may indicate presence of the user 5 in the projected space 125, and may turn off the projector 116 in response to detecting these conditions.

As the device 110 is configured to enable a graphical interaction using the shared projected space 125, the user 5 may move within the projected space 125 while drawing, gesturing, and/or performing other movements. Thus, while the device 110 may be capable of detecting the presence of the user 5 using motion sensors or other techniques known to one of skill in the art, these techniques may negatively affect a user experience as the device 110 may detect the user 5 and turn off the projector even when the user 5 is interacting normally with the projected space 125. For example, using motion sensors and/or the like, the device 110 may detect the presence of an arm or a hand of the user 5 while the user 5 is drawing in the projected space 125, which is not associated with undesirable conditions involving the projector 116.

In order to implement additional control mechanisms associated with the projector 116, the signal processing unit 114 may process audio data to detect the presence of the user's face within and/or in proximity to the projected space 125. For example, the signal processing unit 114 may process first audio data captured by the microphones 118 on top of the device 110 and/or second audio data captured by the reference microphone 118r positioned below the projector 116 to enable audio based projector control processing, as described in greater detail below with regard to FIG. 7. When the signal processing unit 114 determines that a condition is satisfied (e.g., detects that unsafe conditions are present), the signal processing unit 114 may turn off the projector 116.

As illustrated in FIG. 1, the device 110 may receive (130) first image data from the remote device 20 during a communication session and may project (132) a first image using the first image data. For example, the device 110 may project the first image into the projected space 125. The device 110 may then generate (134) first audio data using at least a first microphone and may send (136) the first audio data to the remote device 20 as part of the communication session. For example, the device 110 may include one or more microphones 118 at a first position on the device 110, which are illustrated in FIGS. 1-2 on a top face of the device 110.

To detect presence of the user 5, the device 110 may generate (138) second audio data using a second microphone. For example, the second microphone may be a reference microphone 118r at a second position on the device 110, which is illustrated in FIGS. 1-2 on a side face of the device 110 below the projector 116. The device 110 may detect (140) potentially unsafe conditions using the second audio data and may turn (142) off the projector when the unsafe conditions are detected.

To illustrate a simple example, the signal processing unit 114 may perform voice activity detection (VAD) processing on the second audio data generated by the reference microphone 118r and may turn off the projector 116 when voice activity is detected and a signal strength of the second audio data satisfies a first condition (e.g., above a threshold value). Additionally or alternatively, the signal processing unit 114 may perform breathing activity detection (BAD) processing on the second audio data and may turn off the project 116 when breathing activity is detected and the signal strength of the second audio data satisfies the first condition.

In some examples, the signal processing unit 114 may perform VAD and/or BAD processing on the second audio data and may turn off the projector 116 when (i) voice activity and/or breathing activity is detected and (ii) a first signal strength of the second audio data satisfies a second condition (e.g., greater than a second signal strength of the first audio data, greater than the second signal strength multiplied by a coefficient value, etc.). Additionally or alternatively, the signal processing unit 114 may perform audio beamforming on the first audio data and may determine that human presence is detected when an audio source is detected in a first direction corresponding to the projected space 125.

When the device 110 disables the projector 116, the device 110 may send an indication to the remote device 20 to indicate that the projector 116 is disabled and/or to notify the remote user 25 why the projector 116 is disabled. For example, the remote device 20 may generate a notification indicating that the projector 116 is disabled as a mechanism to prevent the projector 116 from shining in the user's face. Similarly, if the device 110 implements other mechanisms that affect the graphical interaction 200 with the remote user 25, the device 110 may send a notification to the remote device 20 indicating that a mechanism was activated or otherwise notifying the remote user 25 of what occurred.

In some examples, the device 110 may be configured to enable the user 210 and/or the remote device 20 to disable the projector 116 without departing from the disclosure. For example, the user and/or 210 the remote user 25 may notice that the user 5 is doing something potentially unsafe (e.g., moving too close to the projector 116, looking directly at the projector 116, and/or the like) and may manually disable the projector 116 using an input command to the device 110 and/or the remote device 20. Thus, the device 110 may enable the user 210 and/or the remote user 25 to control components of the device 110 to further ensure a safety of the user 5 without departing from the disclosure. The user 210 may generate the input command as a voice command to the device 110, an input to a device associated with the user 210, and/or the like without departing from the disclosure.

To further protect the user 5 during the communication session, the device 110 may implement additional safeguards to reduce potential operational concerns associated with the device 110 and/or components of the device 110. For example, the device 110 may control components of the device 110 using state machines using techniques known to one of skill in the art. The state machines may be configured to detect that certain conditions are present and perform one or more actions in response to the conditions in order to reduce potential operational concerns. To illustrate an example, the state machines may determine that a component is overheating (e.g., temperature exceeds a threshold value) and may increase a fan speed of a cooling fan associated with the component, although the disclosure is not limited thereto. Thus, the state machines may monitor the components of the device 110 and/or conditions associated with the device 110 and may perform one or more action tasks based on the conditions.

In some examples, the device 110 may implement these state machines using a CPU component 112 of the device 110. To implement additional safeguards to ensure that the control mechanisms remain in place, the system 100 may implement two level device peripheral control architecture to provide a fallback system if the CPU component 112 fails. For example, the device 110 may include a second set of control mechanisms implemented by a signal processing unit 114 included in the device 110. Thus, the CPU component 112 may implement primary state machines and the signal processing unit 114 may implement secondary state machines that provide redundancy in case of CPU failure.

In addition to implementing the secondary state machines, the signal processing unit 114 may be used to perform audio signal processing, image signal processing, and/or the like for the device 110. In some examples, the signal processing unit 114 may be configured to implement the audio based projector control processing described above to disable (e.g., turn off) the projector 116 when certain conditions are present. The signal processing unit 114 may perform this audio based projector control processing even when the CPU component 112 is operating normally and the primary state machines are running on the device 110 (e.g., primary processor is in control of the device 110).

To illustrate an example of additional safeguards implemented by the state machines, the device 110 may monitor a temperature of the device 110 and/or the components of the device 110 and may control one or more fan components to ensure that the device 110 and/or the components do not overheat, both to ensure proper functionality of the device 110 and to avoid any danger associated with high temperatures. For example, the device 110 may control a first fan component associated with a central processing unit (CPU) component 112 of the device 110, a second fan component associated with the projector 116, and/or any additional fans (e.g., general cooling fans located within the device 110).

In some examples, the device 110 may set a fan speed of an individual fan component based on a temperature measured at a specific location within the device 110. For example, the device 110 may monitor a first temperature of the CPU component 112 and control a fan speed of the first fan component based on the first temperature, may monitor a second temperature of the projector 116 and control a fan speed of the second fan component based on the second temperature, and/or the like. However, the disclosure is not limited thereto and the device 110 may control the fan components using any technique known to one of skill in the art.

To illustrate another example of control mechanisms, the device 110 may be configured to monitor the projector 116 and/or the projected space 125 to ensure that the projector 116 does not shine in the eyes of the user 5. For example, the device 110 may turn off the projector 116 if a human face is detected in close range to the projector 116, if a human face is detected within the projected space 125, if movement of the device 110 is detected (e.g., using an accelerometer or other sensor configured to detect tilt, lift, or movement), if a voice signal is associated with the bottom of the device 110 (e.g., using beamforming or a second microphone 118 positioned at the bottom of the device 110), if a reflective surface is detected within the projected space 125, and/or the like. While FIG. 2 illustrates multiple microphones 118 positioned at a top surface of the device 110 and a single microphone 118 positioned near a bottom surface of the device 110, the disclosure is not limited thereto. Instead, the device 110 may include two or more microphones 118 near the bottom surface, may have zero microphones 118 near the bottom surface, and/or may include additional microphones 118 not illustrated in FIG. 2 without departing from the disclosure.

To illustrate a further example, the device 110 may be configured to monitor the microphones 118 and/or the loudspeaker 120 to ensure that the input and/or the output is within a safe range. For example, the device 110 may run auto-calibration audio algorithms to ensure that the input is within the safe range and no unsafe gains are added to the input (e.g., to control a volume level of the second audio data that will be sent to the remote device 20). Additionally or alternatively, the device 110 may monitor an output voltage and output current associated with the loudspeaker 120 to calculate an output level of the output audio in decibels. Based on the output level of the output audio, the device 110 may disable (e.g., shutdown) the loudspeaker 120, clip the volume of the first audio data being sent to the loudspeaker 120, and/or other signal processing in order to improve device and human ear comfort.

While the control mechanisms described above may reduce potential operational concerns, these control mechanisms may be circumvented if the CPU component 112 fails for any reason. To implement additional safeguards to ensure that the control mechanisms remain in place, the system 100 may implement two level device peripheral control architecture to provide a fallback system if the CPU component 112 fails. For example, the device 110 may include a second set of control mechanisms implemented by a signal processing unit 114 included in the device 110. Thus, the device 110 may control the peripheral components (e.g., fan components, projector 116, microphones 118, loudspeaker 120, and/or the like) using primary state machines running on the CPU component 112 and secondary state machines running on the signal processing unit 114. If the CPU component 112 is operating normally, the primary state machines control the peripheral components, but if the CPU component 112 stops operating normally, the secondary state machines take control of the peripheral components to ensure that the safety/control mechanisms remain in place.

In some examples, the primary state machines may prioritize a user experience, user interface, and/or the like and may implement complex control mechanisms (e.g., advanced state machines). For example, the primary state machines may control the fan components based on a measured temperature, as described in greater detail above, in order to reduce a noise that the user 5 may find unpleasant or distracting. While this may improve a user experience and reduce distractions to the user 5, this complexity may cause issues and/or result in control concerns. To improve the overall operation of the device 110, the secondary state machines may be intentionally simple (e.g., simple state machines) in order to increase robustness and ensure operation within desired parameters. For example, instead of dynamically controlling a fan speed of an individual fan component, the secondary state machines may set the fan component to a sufficiently high speed to ensure that overheating does not occur. Additionally or alternatively, after a duration of time has elapsed, the secondary state machines may disable (e.g., shutdown) the peripheral components without departing from the disclosure.

Figure 3B:
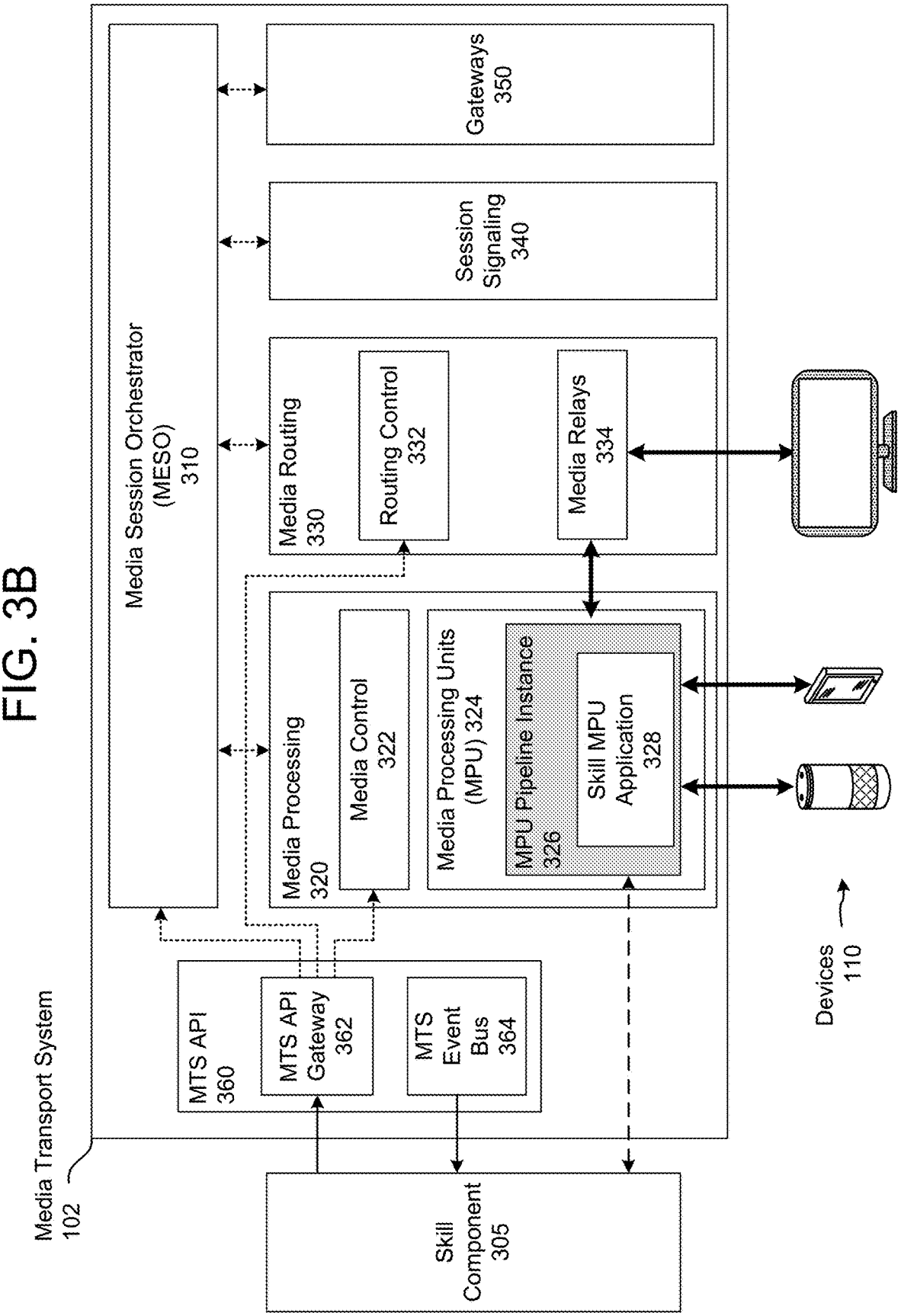

FIGS. 3A-3B illustrate example component diagrams of a media transport system configured to perform media processing according to embodiments of the present disclosure. As illustrated in FIG. 3A, a skill component 305 (e.g., specific skill configured to support communication sessions on the device 110) may interact with a media transport system 102 to request and utilize resources available within the media transport system 102. For example, the skill component 305 may correspond to an application (e.g., process, skill, and/or the like) running on a local device (e.g., device 110) and/or one or more servers, and the skill component 305 may enable a user 5 to interact with the media transport system 102 to initiate and manage a communication session involving media processing, although the disclosure is not limited thereto. To illustrate an example, the user 5 may input a command to an application programming interface (API) for the skill component 305 that is running on the device 110. The device 110 may send a request corresponding to the command to the one or more servers associated with the skill component 305 and the one or more servers may send the request to the media transport system 102.

In some examples, the skill component 305 may be developed (e.g., programmed) by an internal client or other development team (e.g., developer, programmer, and/or the like) to perform specific functionality. Thus, the skill component 305 may be designed to utilize specific resources available within the media transport system 102 and a finished product is made available to the public (e.g., end-user such as user 5). For example, the skill component 305 may enable the user 5 to initiate and/or participate in a communication session (e.g., group conference call, such as videoconferencing), to consume media content (e.g., streaming video data) with unique functionality or processing, and/or perform additional functionality (e.g., perform computer vision processing on image data, speech processing on audio data, machine learning, and/or the like) without departing from the disclosure. In this example, the media transport system 102 provides a simplified interface that enables the internal client to utilize resources within the skill component 305, but the interface and/or resources are not visible to and/or customizable by the end-user that uses the skill component 305.

The disclosure is not limited thereto, however, and in other examples the skill component 305 may be made available for external development to third party clients and/or to individual users. Thus, the media transport system 102 may provide a simplified interface for unique programming without technical expertise. For example, an individual user 5 may customize the skill component 305 using a drag and drop graphical user interface (GUI) to enable unique functionality, enabling the user 5 to program custom routines, skills, and/or the like. To illustrate an example, the user 5 may customize the skill component 305 to receive image data generated by an image sensor, process the image data using computer vision, and then perform specific action(s). For example, the skill component 305 may be programmed so that when a device (e.g., doorbell camera) detects motion and captures image data, the skill component 305 processes the image data using facial recognition to detect authorized users (e.g., family members or other invited guests) and either performs a first action (e.g., unlock the front door when an authorized user is detected) or performs a second action (e.g., send a notification to the user 5 including image data representing an unauthorized user). Thus, the interface and/or resources associated with the media transport system 102 may be visible to and/or customizable by the end-user that uses the skill component 305 without departing from the disclosure.

To enable the skill component 305 to request and utilize resources from within the media transport system 102, the media transport system 102 may include a media session orchestrator (MESO) component 310 configured to coordinate (e.g., define, establish, manage, etc.) a communication session (e.g., media session).

As illustrated in FIG. 3A, the MESO component 310 may interface between components that fall within four distinct categories: media processing components 320, media routing components 330, session signaling components 340, and/or gateway components 350.

Media processing components 320 refers to processing media content to enable unique functionality. For example, the media transport system 102 may provide a hosted back-end that performs media processing on individual streams of data, enabling the skill component 305 to define and control how media content is processed by the media transport system 102. The media processing components 320 may correspond to real time processing (e.g., data is processed during run-time, such as while streaming video to a user 5, during a videoconference, and/or the like) or offline processing (e.g., data is processed and stored in a database for future requests, such as during batch processing) without departing from the disclosure.

The media processing components 320 may include at least one media control component 322 and/or at least one media processing unit (MPU) 324 (e.g., first MPU 324a, second MPU 324b, etc.). The media control component 322 may coordinate media processing by sending control data to and/or receiving control data from other components within the media transport system 102. For example, the MESO component 310 may send a request to the media control component 322 to launch a specific application (e.g., skill, process, etc.) to perform media processing and the media control component 322 may send an instruction to a corresponding MPU 324.

The MPU 324 may be configured to perform media processing to enable additional functionality. Thus, the MPU 324 may receive first data and process the first data to generate second data. As part of performing media processing, the MPU 324 may perform speech processing on audio data and/or image data, perform computer vision processing on image data, modify audio data and/or image data, apply visual effects (e.g., overlay or other graphical element(s)) to image data, and/or the like to enable interesting functionality without departing from the disclosure. For example, the MPU 324 may generate subtitles (e.g., text data) corresponding to speech represented in image data, may translate the subtitles to a different language, may perform text-to-speech processing to enable additional functionality (e.g., describing visual cues for someone that is visually impaired, replacing dialog with speech in a different language, etc.), may perform voice recognition to identify voices represented in audio data, may perform facial recognition to detect and/or identify faces represented in image data, may perform object recognition to detect and/or identify objects represented in image data, may add a graphical overlay to image data (e.g., censoring portions of the image data, adding symbols or cartoons to the image data, etc.), may perform other processing to media content (e.g., colorize black and white movies), and/or the like without departing from the disclosure.

In some examples, the media transport system 102 may perform media processing using two or more MPUs 324. For example, the media transport system 102 may perform first media processing using a first MPU 324a and perform second media processing using a second MPU 324b. To illustrate an example, a communication session may correspond to a video chat implementation that includes image data and audio data and the media transport system 102 may perform media processing in parallel. For example, the media transport system 102 may separate the image data and the audio data, performing first media processing on the image data and separately performing second media processing on the audio data, before combining the processed image data and the processed audio data to generate output data. However, the disclosure is not limited thereto, and in other examples the media transport system 102 may perform media processing in series without departing from the disclosure. For example, the media transport system 102 may process first image data using the first MPU 324a (e.g., first media processing) to generate second image data and may process the second image data using the second MPU 324b (e.g., second media processing) to generate output image data. Additionally or alternatively, the media transport system 102 may perform multiple media processing steps using a single MPU 324 (e.g., more complex media processing) without departing from the disclosure.

The media transport system 102 may include media routing components 330 that are configured to route media (e.g., send data packets) to and from the device(s) 110 via the network(s) 199. For example, the media routing components 330 may include one or more routing control components 332, media relay components 334, point of presence selection components 336, geographic selection components 337, and/or capability selection components 338. Examples of media relay components may include a Session Traversal of User Datagram Protocol (UDP) Through Network Address Translators (NATs) system (e.g., STUN system) and/or a Traversal Using relays around NAT (TURN) system, although the disclosure is not limited thereto. While FIG. 3A illustrates the media routing components 330 including the point of presence selection components 336, geographic selection components 337, and/or capability selection components 338 as separate components, this is for ease of illustration and the disclosure is not limited thereto. Instead, a single component may perform point of presence selection, geographic selection, and/or capability selection without departing from the disclosure.

In some examples, the media transport system 102 may separate the MPUs 324 from the network(s) 199 so that the MPUs 324 do not have a publicly accessible internet protocol (IP) address (e.g., cannot route outside of a local network). Thus, the system 100 may use the media relay components 334 to send the first data from a first device to the MPUs 324 and/or the second data (e.g., processed data) generated by the MPUs 324 from the MPUs 324 to a second device. For example, an individual device 110 may be associated with a specific TURN server, such that the system 100 may route data to and from the first device using a first TURN server and route data to and from the second device using a second TURN server.

While the example described above illustrates routing data to and from the media processing components 320, the media routing components 330 may be used to route data separately from the media processing components 320 without departing from the disclosure. For example, the system 100 may route data directly between devices 110 using one or more TURN servers (e.g., TURN system) without departing from the disclosure. Additionally or alternatively, the system 100 may route data using one or more STUN servers (e.g., STUN system), such as when a device 110 has a publicly accessible IP address. In some examples, the system may establish communication sessions using a combination of the STUN system and the TURN system without departing from the disclosure. For example, a communication session may be more easily established/configured using the TURN system, but may benefit from latency improvements using the STUN system. Thus, the system 100 may route data using the STUN system, the TURN system, and/or a combination thereof without departing from the disclosure.

In addition to routing data, the media routing components 330 also perform topology optimization. For example, the media routing components 330 may include geographically distributed media relay components (e.g., TURN/STUN servers) to enable the media transport system 102 to efficiently route the data packets. For example, the media routing components 330 may include a control plane that coordinates between the media relay components to select an optimum route (e.g., data path) to send the data packets. To illustrate an example, the media routing components 330 may determine a location of parties in a communication session and determine a data path that bypasses a particular country or chokepoint in the data network. In some examples, the media routing components 330 may select an enterprise specific route and only use specific connected links associated with the enterprise. Additionally or alternatively, the routing components 330 may apply machine learning models to further reduce latency by selecting the optimum route using non-geographical parameters (e.g., availability of servers, time of day, previous history, etc.).

While the description of the media relay components 334 refers to the STUN system and/or the TURN system, the disclosure is not limited thereto. Instead, the media routing components 330 may use any alternative systems known to one of skill in the art to route the data packets. For example, the media routing components 330 may use any technique that routes UDP data packets and allows the UDP data packets to traverse the NATs without departing from the disclosure. To illustrate an example, the media routing components 330 may include UDP packet forwarding and relay devices instead of the TURN system without departing from the disclosure.

The media transport system 102 may include session signaling components 340 (e.g., edge signaling, signaling network, etc.) that may be configured to coordinate signal paths (e.g., routing of data packets) and/or a type of data packets sent between the devices 110 and server(s) within the media transport system 102. For example, the session signaling components 340 may enable the devices 110 to coordinate with each other to determine how data packets are sent between the devices 110. In some examples, a signal path may correspond to a routing table that indicates a particular route or network addresses with which to route data between two devices, although the disclosure is not limited thereto. As illustrated in FIG. 3A, the session signaling components 340 may support protocols including Session Initiation Protocol (SIP) 341, Real-Time Communication (RTC) protocol 342 (e.g., WebRTC protocol), Alexa Voice Service (AVS) protocol 343 or other voice user interface protocols, Extensible Messaging and Presence Protocol (XMPP) 344, IP Multimedia Core Network Subsystem (IMS) 345, H.323 standard 346, and/or the like, although the disclosure is not limited thereto.

The media transport system 102 may include gateway components 350 that enable the media transport system 102 to interface with (e.g., send/receive media content or other data) external networks. As illustrated in FIG. 3A, the gateway components 350 may include a public switched telephone network (PSTN) gateway 352, a mobile carrier gateways 354, a social networking gateway 356, an IP communication network gateway 358, and/or other gateways known to one of skill in the art. While FIG. 3A illustrates the gateway components 350 including a single gateway for each external network, this is intended for illustrative purposes only and the gateway components 350 may include multiple gateways for each external network without departing from the disclosure. For example, the gateway components 350 may include multiple PSTN gateways 352 having different locations without departing from the disclosure. Additionally or alternatively, a single type of external network may correspond to multiple external networks without departing from the disclosure. For example, the gateway components 350 may include a first mobile carrier gateway 354 corresponding to a first mobile carrier network and a second mobile carrier gateway 354b corresponding to a second mobile carrier network without departing from the disclosure. However, the disclosure is not limited thereto and two or more mobile carrier networks may share a mobile carrier gateway 354 without departing from the disclosure.

To illustrate an example of using the gateway components 350, the system 100 may use the PSTN gateway 352 to establish a communication session with a PSTN device (e.g., wired/wireless telephone, cellular phone, and/or the like that is associated with a PSTN telephone number) using the PSTN. For example, the system 100 may use the session signaling components 340 to send SIP data packets from a device 110 to a PSTN gateway 352. The PSTN gateway 352 may receive the SIP data packets, convert the SIP data packets to audio data in a different format, and send the audio data to the PSTN device via the PSTN. Thus, the gateway components 350 may include a plurality of gateways, with each gateway being associated with a specific external network and configured to act as an interface between the media transport system 102 and the external network.

FIG. 3B illustrates an example of signal paths and data flow between components within the media transport system 102. As illustrated in FIG. 3B, the skill component 305 may send data to a media transport system (MTS) application programming interface (API) 360. The MTS API 360 may include an MTS API gateway component 362 that receives the data (e.g., request) and sends data to the MESO component 310, the media processing components 320, the media routing components 330, and/or other components. For example, FIG. 3B illustrates the MTS API gateway component 362 communicating with the MESO component 310, the media control component 322, and the routing control component 332.

As described above with regard to FIG. 3A, the MESO component 310 may communicate with the media processing components 320, the media routing components 330, the session signaling components 340, and/or the gateway components 350. Internal signaling within the media transport system 102 is represented in FIG. 3B as dotted lines.

The components within the media transport system 102 may process the request received from the MTS API gateway 362 and send data to the MTS API 360 in response to processing the request. For example, components within the media transport system 102 may send data to an MTS event bus 364 of the MTS API 360 and the MTS event bus 364 may send data (e.g., event, notification, etc.) to the skill component 305. Data sent as part of the MTS interface between the skill component 305 and the media transport system 102 is represented in FIG. 3B using a solid line.

As illustrated in FIG. 3B, the skill component 305 may communicate with the MPU 324. For example, the skill component 305 may communicate with an MPU pipeline instance 326 running within the MPU 324 that includes a skill MPU application 328. Thus, the skill component 305 may communicate directly with the skill MPU application as part of an application interface, which is represented as a dashed line in FIG. 3B. In addition to communicating with the skill component 305, the MPU pipeline instance 326 may send data (e.g., media content) to the devices 110, either directly or via the media relay components 334.

As used herein, an MPU pipeline instance or any other instance may refer to a specific component that is executing program code; all of the logic associated with the media processing unit is running in memory in a single host, which decreases latency associated with the media processing. For example, conventional techniques for executing asynchronous workflows perform checkpointing to store data in storage components between events. Thus, when a new event occurs, the conventional techniques retrieve the stored session and loads data into the memory, resulting in a large amount of latency. As part of reducing the latency, the media transport system 102 may use the MESO component 310 to route triggers and events directly to the MPU pipeline instance that is performing the media processing, enabling the media transport system 102 to perform media processing in real-time.

Using the MESO component 310, the media transport system 102 allows skills and/or applications to enable unique functionality without requiring the skill/application to independently develop and/or program the functionality. Thus, the media transport system 102 may offer media processing operations as a service to existing skills/applications. For example, the media transport system 102 may enable a skill to provide closed captioning or other features without building a closed captioning service. Instead, the media transport system 102 may route a communication session through an MPU 324 configured to perform closed captioning. Thus, an MPU 324 configured to enable a specific feature may be utilized to enable the feature on multiple skills without departing from the disclosure.

As the MESO component 310 is capable of executing requests and commands with low latency, the media transport system 102 may utilize multiple components within a single communication session. For example, the media transport system 102 may combine multiple different components (e.g., MPUs 324 associated with one or more skills) to piece together a custom implementation enabling a combination of existing features. To illustrate an example, the media transport system 102 may build back to back SIP user engine that is customizable for a specific implementation. Thus, the MESO component 310 may mix and match different components and/or features to provide a customized experience.

Figure 4A:
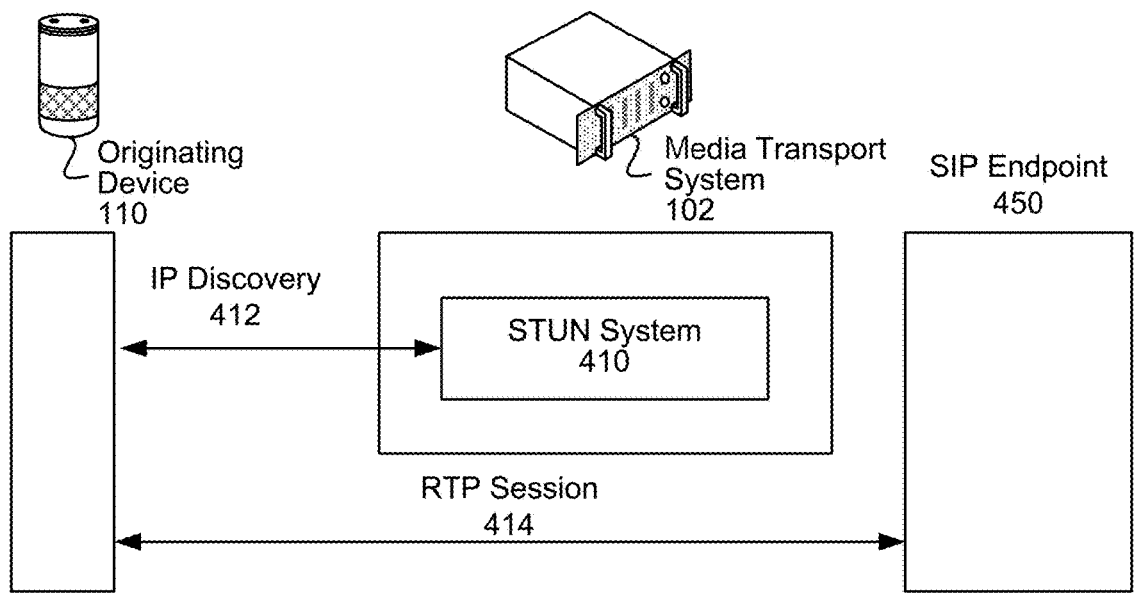
FIGS. 4A-4B illustrate examples of establishing media connections between devices according to embodiments of the present disclosure.
Figure 4B:
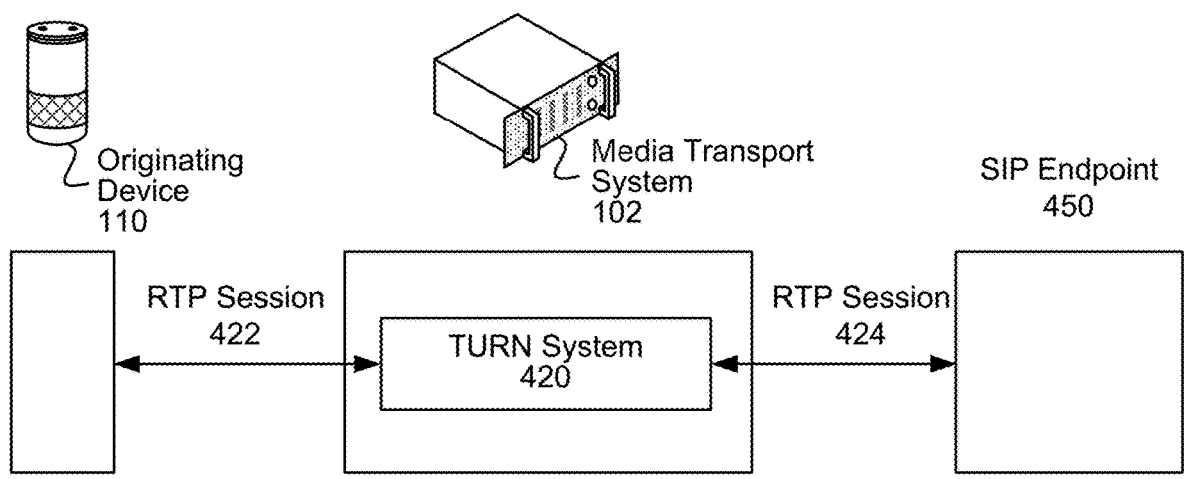

FIGS. 4A-4B illustrate examples of establishing media connections between devices according to embodiments of the present disclosure. In some examples, an originating device 110 may have a publicly accessible IP address and may be configured to establish a real-time transport (RTP) protocol communication session directly with a SIP endpoint 450. The SIP endpoint 450 may correspond to a device 110, a component within the media transport system 102, a gateway component configured to interface with a remote network, and/or a device associated with the remote network itself. To enable the originating device 110 to establish the RTP communication session, the media transport system 102 may include Session Traversal of User Datagram Protocol (UDP) Through Network Address Translators (NATs) system (e.g., STUN system 410). The STUN system 410 may be configured to allow NAT clients (e.g., an originating device 110 behind a firewall) to setup calls to a Voice over Internet Protocol (VoIP) provider hosted outside of the local network by providing a public IP address, the type of NAT they are behind, and a port identifier associated by the NAT with a particular local port. As illustrated in FIG. 4A, the originating device 110 may perform (412) IP discovery using the STUN system 410 and may use this information to set up an RTP communication session 414 (e.g., UDP communication) between the originating device 110 and the SIP endpoint 450 to establish a call.

In some examples, the originating device 110 may not have a publicly accessible IP address. For example, in some types of NAT the originating device 110 cannot route outside of the local network. To enable the originating device 110 to establish an RTP communication session, the media transport system 102 may include Traversal Using relays around NAT (TURN) system 420. The TURN system 420 may be configured to connect the originating device 110 to the SIP endpoint 450 when the originating device 110 is behind a NAT. As illustrated in FIG. 4B, the originating device 110 may establish (422) an RTP session with the TURN system 420 and the TURN system 420 may establish (424) an RTP session with the SIP endpoint 450. Thus, the originating device 110 may communicate with the SIP endpoint 450 via the TURN system 420. For example, the originating device 110 may send audio data and/or image data to the media transport system 102 and the media transport system 102 may send the audio data and/or the image data to the SIP endpoint 450. Similarly, the SIP endpoint 450 may send audio data and/or image data to the media transport system 102 and the media transport system 102 may send the audio data and/or the image data to the originating device 110.

In some examples, the system may establish communication sessions using a combination of the STUN system 410 and the TURN system 420 without departing from the disclosure. For example, a communication session may be more easily established/configured using the TURN system 420, but may benefit from latency improvements using the STUN system 410. Thus, the system may use the STUN system 410 when the communication session may be routed directly between two devices and may use the TURN system 420 for all other communication sessions. Additionally or alternatively, the system may use the STUN system 410 and/or the TURN system 420 selectively based on the communication session being established. For example, the system may use the STUN system 410 when establishing a communication session between two devices (e.g., point-to-point) within a single network (e.g., corporate LAN and/or WLAN), but may use the TURN system 420 when establishing a communication session between two devices on separate networks and/or three or more devices regardless of network(s).

When the communication session goes from only two devices to three or more devices, the system may need to transition from the STUN system 410 to the TURN system 420. Thus, if the system anticipates three or more devices being included in the communication session, the communication session may be performed using the TURN system 420. Similarly, when the communication session goes from three or more devices to only two devices, the system may need to transition from the TURN system 420 to the STUN system 410.

While FIGS. 4A-4B illustrate an RTP communication session being established between the originating device 110 and the SIP endpoint 450, the present disclosure is not limited thereto and the RTP communication session may be established between the originating device 110 and a gateway component or other device associated with the SIP endpoint 450 without departing from the present disclosure. Additionally or alternatively, while FIGS. 4A-4B illustrate examples of enabling communication sessions using the SIP protocol, the disclosure is not limited thereto and the media transport system 102 may use any protocols known to one of skill in the art.

While FIGS. 4A-4B illustrate examples of enabling communication sessions using a data connection (e.g., using Voice over Internet Protocol (VoIP), session initiation protocol (SIP), and/or the like), the disclosure is not limited thereto and the system 100 may enable communication sessions using any type of network without departing from the disclosure. For example, the media transport system 102 may enable communication sessions using a cellular connection (e.g., mobile phone network) or other external network without departing from the disclosure. For example, the media transport system 102 may send instructions (e.g., command data) to endpoints (e.g., caller devices, such as the device 110) instructing the endpoint to establish a communication session (e.g., dial a telephone number) in response to the voice command.

FIG. 5 illustrates a schematic diagram of an example device implementing audio based projector control architecture according to embodiments of the present disclosure. As illustrated in FIG. 5, the device 110 may include a main CPU component 112, a signal processing unit 114, and a plurality of peripheral components that are connected to both the CPU component 112 and the signal processing unit 114 via a bus 510. For example, FIG. 5 illustrates that the CPU component 112 and the signal processing unit 114 may be connected to a projector 116, a plurality of microphones 118 (e.g., three or more microphones 118 along a top surface of the device 110 and an individual reference microphone 118r located near a bottom surface of the device 110 below the projector 116), a loudspeaker 120, one or more camera(s) 122, and/or a fan component 515 via the bus 510. However, the disclosure is not limited thereto, and the number and/or location of the peripheral components may vary without departing from the disclosure. While FIG. 5 illustrates that the device 110 includes at least one loudspeaker 120, the disclosure is not limited thereto and a number of loudspeakers 120 may vary without departing from the disclosure.

As illustrated in FIG. 5, the signal processing unit 114 may be independent from the CPU component 112 and may be configured to perform signal processing (e.g., audio/video processing capabilities) for the device 110. For example, the signal processing unit 114 may be configured to perform specialized computation tasks such as voice/audio/video processing. Thus, the signal processing unit 114 is already included in the device 110 and is already connected to the peripheral components via the bus 510.

As described above with regard to FIG. 2, the device 110 may be configured to enable a graphical interaction using a shared projected space. For example, the device 110 may receive image data from a remote device 20 during a communication session and may generate projected space 125 using the projector 116. As illustrated in FIG. 5, the projector 116 may be configured to project an image onto projected space 125, which corresponds to a flat surface positioned below the device 110.

During the communication session, the device 110 may generate image data using one or more camera(s) 122, generate audio data using one or more microphones 118, and may send the image data and/or the audio data to the remote device 20. In some examples, the device 110 may include a first camera 122a configured to capture the projected space 125, such that the device 110 may send first image data corresponding to the projected space 125 to the remote device 20. For example, the device 110 may enable the user 5 to collaborate on a drawing with the remote user 25 associated with the remote device 20. Additionally or alternatively, the device 110 may include a second camera 122b configured to capture the user 5, such that the device 110 may send second image data representing the user 5 to the remote device 20. Thus, the device 110 may enable the remote user 25 to see the user 5 separately from the projected space 125. However, the disclosure is not limited thereto and the device 110 may send the first image data, the second image data, the first image data and the second image data, or no image data without departing from the disclosure.

In some examples, the device 110 may include one or more microphones 118 positioned on a first surface of the device 110 (e.g., top surface, although the disclosure is not limited thereto) that are configured to capture first audio data. In addition, the device 110 may include a reference microphone 118r positioned on a second surface of the device 110 (e.g., below the projector 116) that is configured to capture second audio data. Thus, the device 110 may send the first audio data, the second audio data, and/or a combination thereof to the remote device 20 during the communication session.

During a communication session, the signal processing unit 114 may perform audio processing and/or image processing (e.g., video processing) for the device 110. For example, the signal processing unit 114 may process the first image data and/or the second image data prior to sending the first image data and/or the second image data to the remote device 20. Additionally or alternatively, the signal processing unit 114 may perform audio processing on the first audio data and/or the second audio data prior to sending the first audio data and/or the second audio data to the remote device 20. Examples of audio processing may include audio beamforming, echo cancellation processing (e.g., acoustic echo cancellation (AEC), acoustic interference cancellation (AIC), and/or the like), residual echo suppression (RES) processing, and/or other techniques known to one of skill in the art.

In addition to performing audio processing for the communication session, in some examples the device 110 may use the signal processing unit 114 to implement additional control mechanisms. To illustrate an example, the signal processing unit 114 may perform audio based projector control processing to disable (e.g., turn off) the projector 116 when certain conditions are present. For example, the signal processing unit 114 may detect the presence of the user 5 in the projected space 125 and may turn off the projector 116 when appropriate to avoid the projector 116 shining a bright light into the user's face.

As the device 110 is configured to enable a graphical interaction using the shared projected space 125, the user 5 may move within the projected space 125 while drawing, gesturing, and/or performing other movements. Thus, while the device 110 may be capable of detecting the presence of the user 5 using motion sensors or other techniques known to one of skill in the art, these techniques may negatively affect a user experience as the device 110 may detect the user 5 and turn off the projector even when the user 5 is interacting normally with the projected space 125. For example, using motion sensors and/or the like, the device 110 may detect the presence of an arm or a hand of the user 5 while the user 5 is drawing in the projected space 125, which is not associated with an operational concern involving the projector 116.

In order to implement additional control mechanisms associated with the projector 116, the signal processing unit 114 may process audio data to detect the presence of the user's face within and/or in proximity to the projected space 125. For example, the signal processing unit 114 may process first audio data captured by the microphones 118 on top of the device 110 and/or second audio data captured by the reference microphone 118r positioned below the projector 116 to enable audio based projector control, as described in greater detail below with regard to FIG. 7. To illustrate a simple example, the signal processing unit 114 may perform voice activity detection (VAD) processing on the second audio data generated by the reference microphone 118r and may turn off the projector 116 when voice activity is detected and a signal strength of the second audio data satisfies a first condition (e.g., above a threshold value). Additionally or alternatively, the signal processing unit 114 may perform breathing activity detection (BAD) processing on the second audio data and may turn off the project 116 when breathing activity is detected and the signal strength of the second audio data satisfies the first condition.

In some examples, the signal processing unit 114 may perform VAD and/or BAD processing on the second audio data and may turn off the projector 116 when (i) voice activity and/or breathing activity is detected and (ii) a first signal strength of the second audio data satisfies a second condition (e.g., greater than a second signal strength of the first audio data, greater than the second signal strength multiplied by a coefficient value, etc.). Additionally or alternatively, the signal processing unit 114 may perform audio beamforming on the first audio data and may determine that human presence is detected when an audio source is detected in a first direction corresponding to the projected space 125.

The bus 510 enables the CPU component 112 and/or the signal processing unit 114 to control all of the peripheral components, either directly or indirectly. During normal operation, the CPU component 112 may be configured to control the peripheral components using advanced state machines, as will be described in greater detail below. However, as an additional safeguard, if the CPU component 112 stops functioning normally the signal processing unit 114 may be configured to control the peripheral components using simple state machines. Thus, the device 110 may configure the signal processing unit 114 to run simple state machines in order to provide additional safeguards (e.g., double fault protection) for the device 110.

Figure 6:
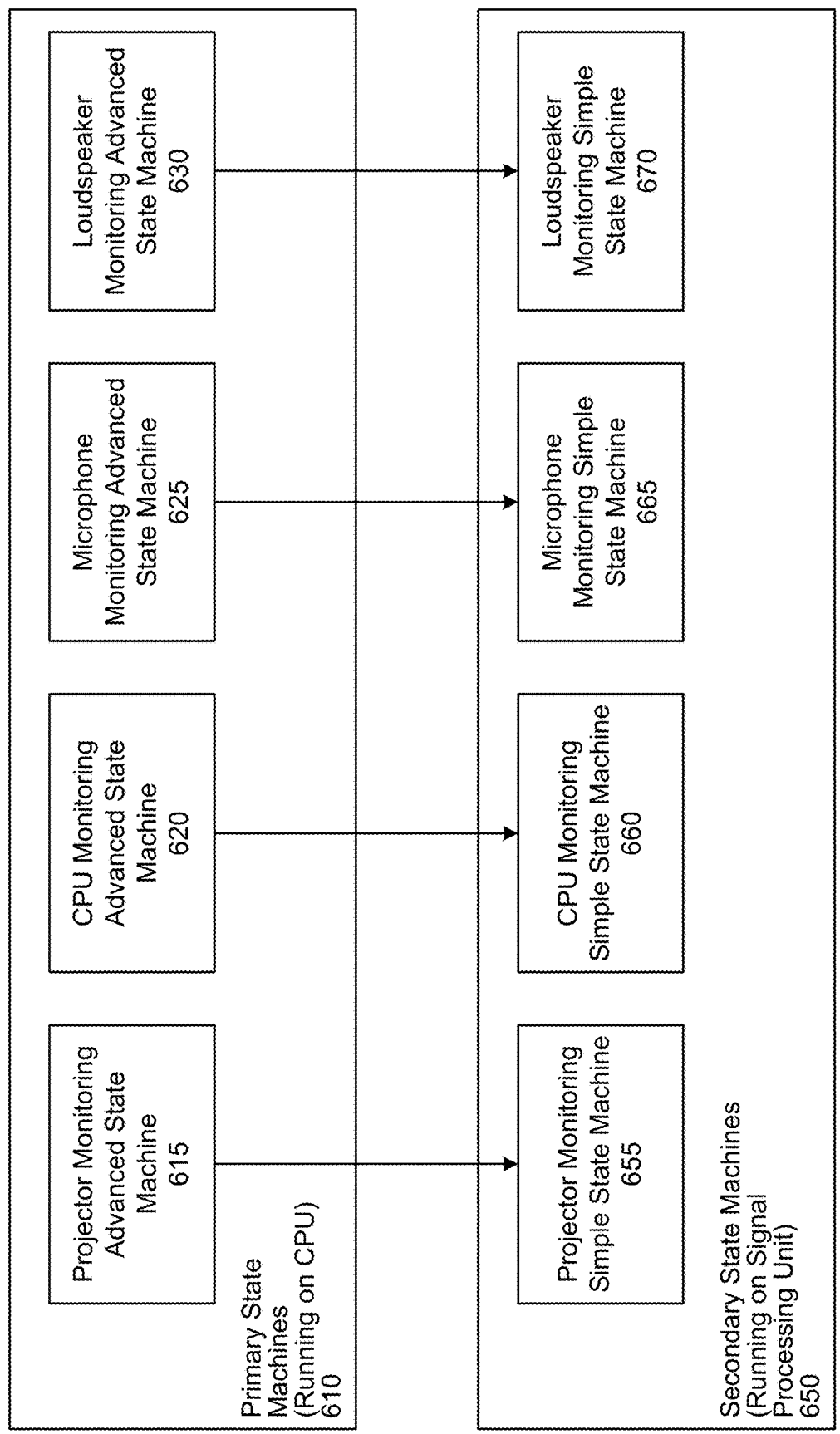
FIG. 6 illustrates an example of advanced state machines and simple state machines included in a projector device according to embodiments of the present disclosure.

FIG. 6 illustrates an example of advanced state machines and simple state machines included in a projector device according to embodiments of the present disclosure. As illustrated in FIG. 6, the system 100 may implement double-fault protection 600 by including primary state machines 610 that are running on the CPU component 112 as well as secondary state machines 650 that are running on the signal processing unit 114.

FIG. 6 illustrates examples of the primary state machines 610, which include a projector monitoring advanced state machine 615, a CPU monitoring advanced state machine 620, a microphone monitoring advanced state machine 625, and a loudspeaker monitoring advanced state machine 630, although the disclosure is not limited thereto. A detailed explanation of the primary state machines 610 is provided below with regard to FIGS. 19-20.

FIG. 6 also illustrates examples of the secondary state machines 650, which include a projector monitoring simple state machine 655, a CPU monitoring simple state machine 660, a microphone monitoring simple state machine 665, and a loudspeaker monitoring simple state machine 670, although the disclosure is not limited thereto. A detailed explanation of the secondary state machines 650 is provided below with regard to FIGS. 17-18.

FIG. 7 illustrates an example of projector monitoring according to embodiments of the present disclosure. As illustrated in FIG. 7, the device 110 may use the projector monitoring advanced state machine 615 to monitor a projector output zone 710 using a monitoring routine 720. For example, the monitoring routine 720 may monitor (722) the projector output zone 710 for human presence and may determine (724) whether presence is detected. If presence is not detected, the monitoring routine 720 may loop to step 722 and continue monitoring the project output zone 710. If presence is detected (e.g., conditions are satisfied), the monitoring routine 720 may turn (726) off the projector 116 to avoid shining light in the user's face.

While FIG. 7 illustrates the projector monitoring advanced state machine 615 performing the monitoring routine 720, these steps may be performed by the signal processing unit 114, as described above. For example, the signal processing unit 114 may perform audio processing to monitor the projector output zone 710 and determine whether human presence is detected. However, the disclosure is not limited thereto, and the signal processing unit 114 may perform the monitoring routine 720 separately from the projector monitoring advanced state machine 615 without departing from the disclosure.

Figure 8:
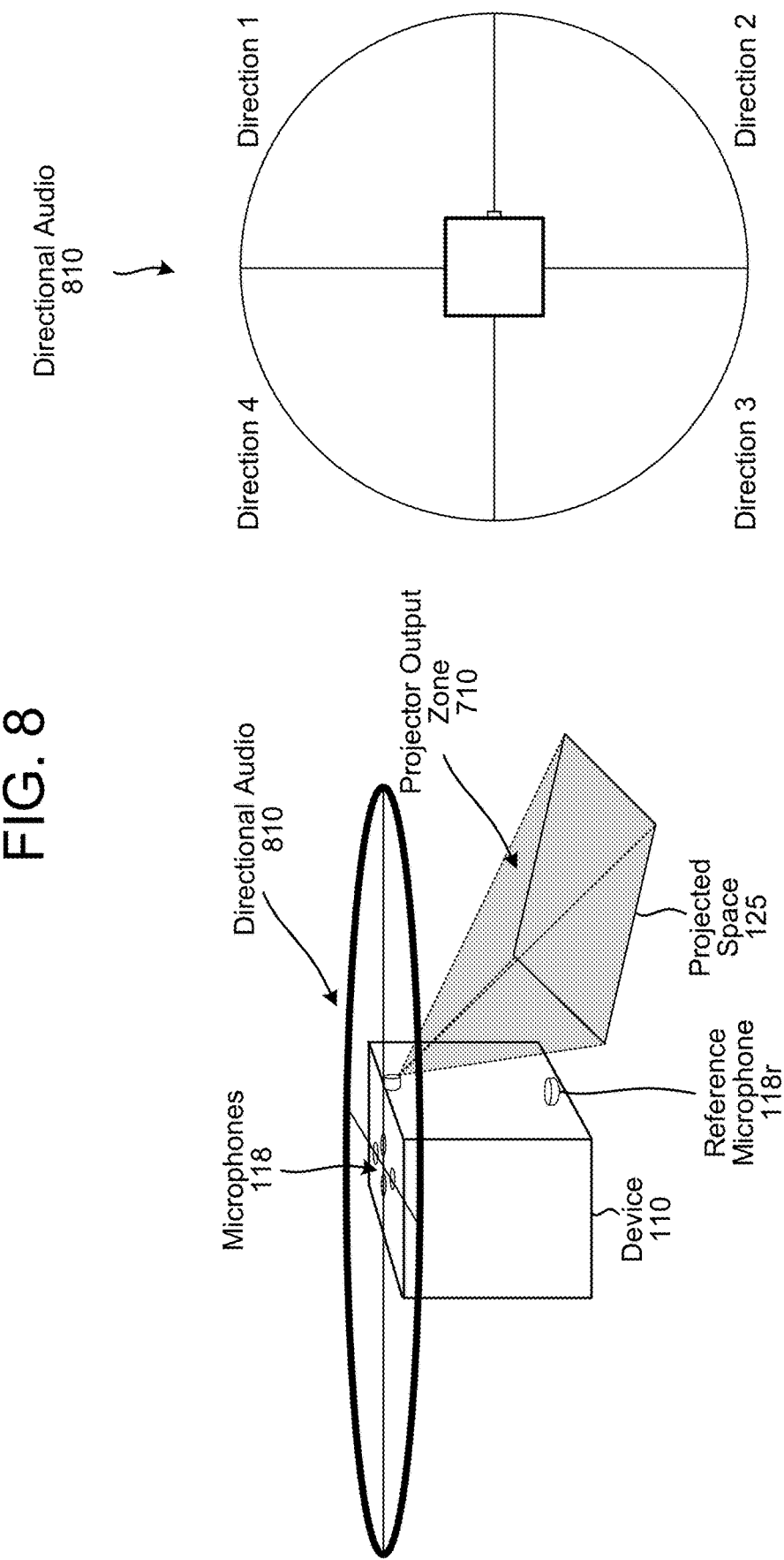
FIG. 8 illustrates an example of performing audio beamforming according to embodiments of the present disclosure.

FIG. 8 illustrates an example of performing audio beamforming according to embodiments of the present disclosure. As illustrated in FIG. 8, the device 110 may generate first audio data using the microphones 118 positioned on a first surface of the device 110 (e.g., top surface) and may perform audio beamforming using the first audio data to generate directional audio 810.

In audio systems, beamforming refers to techniques that are used to isolate audio from a particular direction in a multi-directional audio capture system. Beamforming may be particularly useful when filtering out noise from non-desired directions. Beamforming may be used for various tasks, including isolating voice commands to be executed by a speech-processing system or identifying a direction associated with an audio source.

One technique for beamforming involves boosting audio received from a desired direction while dampening audio received from a non-desired direction. In one example of a beamformer system, a fixed beamformer unit employs a filter-and-sum structure to boost an audio signal that originates from the desired direction (sometimes referred to as the look-direction) while largely attenuating audio signals that original from other directions. A fixed beamformer unit may effectively eliminate certain diffuse noise (e.g., undesireable audio), which is detectable in similar energies from various directions, but may be less effective in eliminating noise emanating from a single source in a particular non-desired direction. The beamformer unit may also incorporate an adaptive beamformer unit/noise canceller that can adaptively cancel noise from different directions depending on audio conditions.

In the example illustrated in FIG. 8, the device 110 may distinguish between four different directions (e.g., beams). Thus, the device 110 may determine whether speech or other audible sounds are associated with a first direction (e.g., Direction 1, from 0-90 degrees using the top of FIG. 8 as a reference point), a second direction (e.g., Direction 2, from 90-180 degrees), a third direction (e.g., Direction 3, from 180-270 degrees), or a fourth direction (e.g., Direction 4, from 270-360 degrees). For purposes of detecting human presence in the projector output zone 710, the device 110 may determine whether an audio source is located in the first direction or the second direction (e.g., 0-180 degrees, in front of the projector 116), as described in greater detail below. Thus, the device 110 may ignore audible sounds associated with the third direction or the fourth direction (e.g., 180-360 degrees, opposite the projector 116) as this is outside of the projector output zone 710.

While FIG. 8 illustrates an example of performing beamforming to distinguish between four different directions, the disclosure is not limited thereto and the device 110 may perform beamforming using any number of directions (e.g., beams) without departing from the disclosure. For example, the device 110 may perform beamforming using eight different directions without departing from the disclosure. Using this example, the device 110 may associate the projector output zone 710 with Directions 1-4 (e.g., 0-180 degrees) and may ignore Directions 5-8 (e.g., 180-360 degrees). However, the disclosure is not limited thereto, and the device 110 may instead associate the projector output zone 710 with Directions 2-3 (e.g., 45-135 degrees), while ignoring Directions 1 and 4-8 (e.g., 0-45 degrees and 135-360 degrees), without departing from the disclosure.

Figure 9:
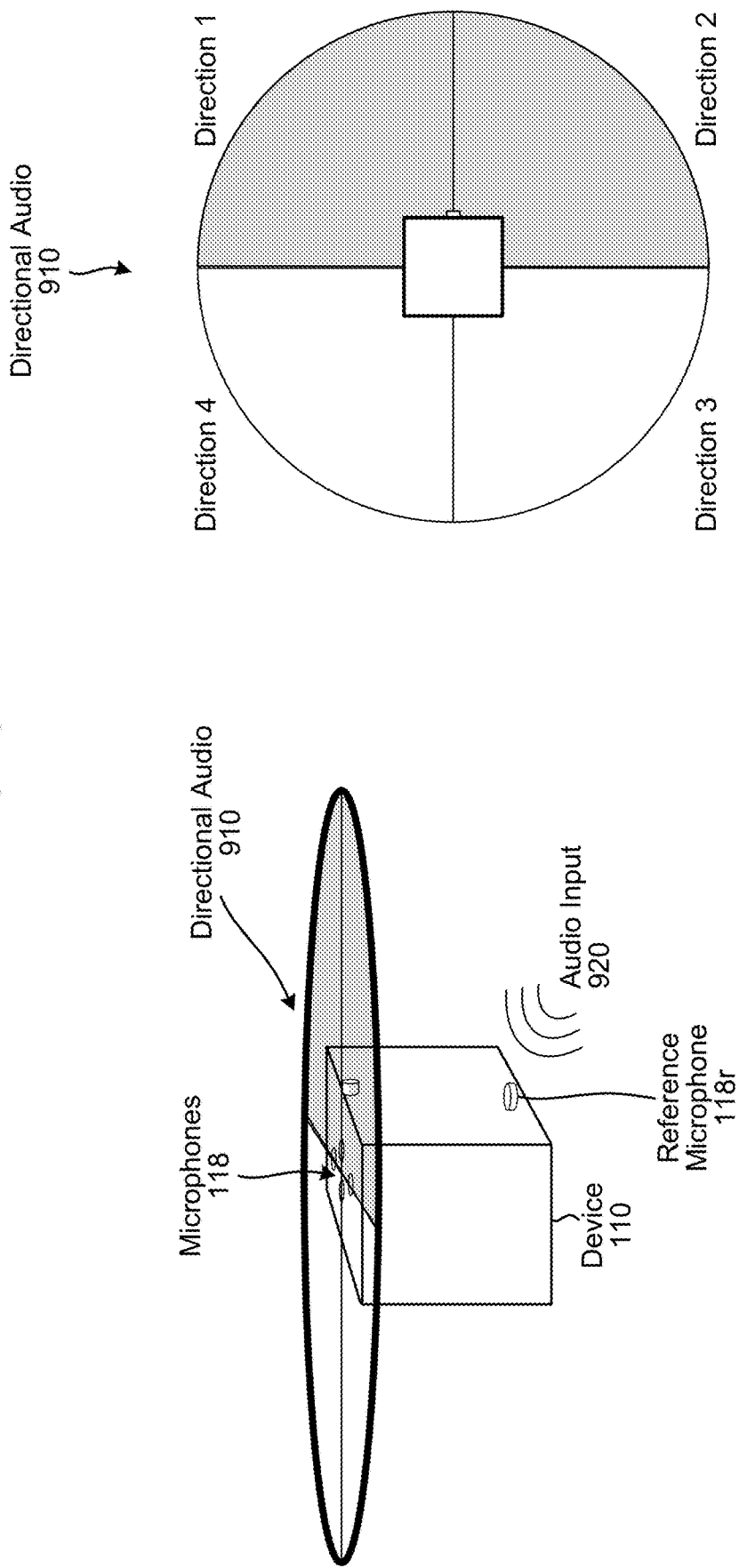
FIG. 9 illustrates an example of detecting human presence near the projected space according to embodiments of the present disclosure.

FIG. 9 illustrates an example of detecting human presence near the projected space according to embodiments of the present disclosure. As illustrated in FIG. 9, the device 110 may distinguish between four different directions (e.g., beams). For purposes of detecting human presence in the projector output zone 710, the device 110 may determine whether an audio source is located in the first direction or the second direction (e.g., 0-180 degrees, in front of the projector 116), represented as directional audio 910. Thus, the device 110 may ignore audible sounds associated with the third direction or the fourth direction (e.g., 180-360 degrees, opposite the projector 116) as this is outside of the projector output zone 710.

As discussed above, the directional audio 910 is intended to conceptually illustrate an example of beamforming and the disclosure is not limited thereto. Instead, the number of directions may vary without departing from the disclosure, such that the device 110 may generate directional audio with eight or more directions without departing from the disclosure. Additionally or alternatively, the device 110 may associate any number of directions with the projector output zone 710 without departing from the disclosure. In some examples, the device 110 may associate half of the directions (e.g., 0-180 degrees) with the projector output zone 710 and may ignore audible sounds originating from the other directions (e.g., 180-360 degrees). However, the disclosure is not limited thereto, and the device 110 may associate any range of directions with the projector output zone 710 without departing from the disclosure.

In addition to determining that the audible sound is associated with the first direction or the second direction (e.g., Direction 1 or Direction 2, corresponding to 0-180 degrees), the device 110 may also determine whether audio input 920 is detected by the reference microphone 118r and may perform additional processing on the audio input 920.

For example, the device 110 may perform voice activity detection (VAD) processing to determine whether voice activity is detected in the audio input 920. Additionally or alternatively, the device 110 may perform breathing activity detection (BAD) processing to determine whether breathing activity is detected in the audio input 920. In some examples, the device 110 may compare a first signal strength of the audio input 920 to a second signal strength of audio data generated by the microphones 118 on the top surface of the device 110, although the disclosure is not limited thereto.

Figure 10:
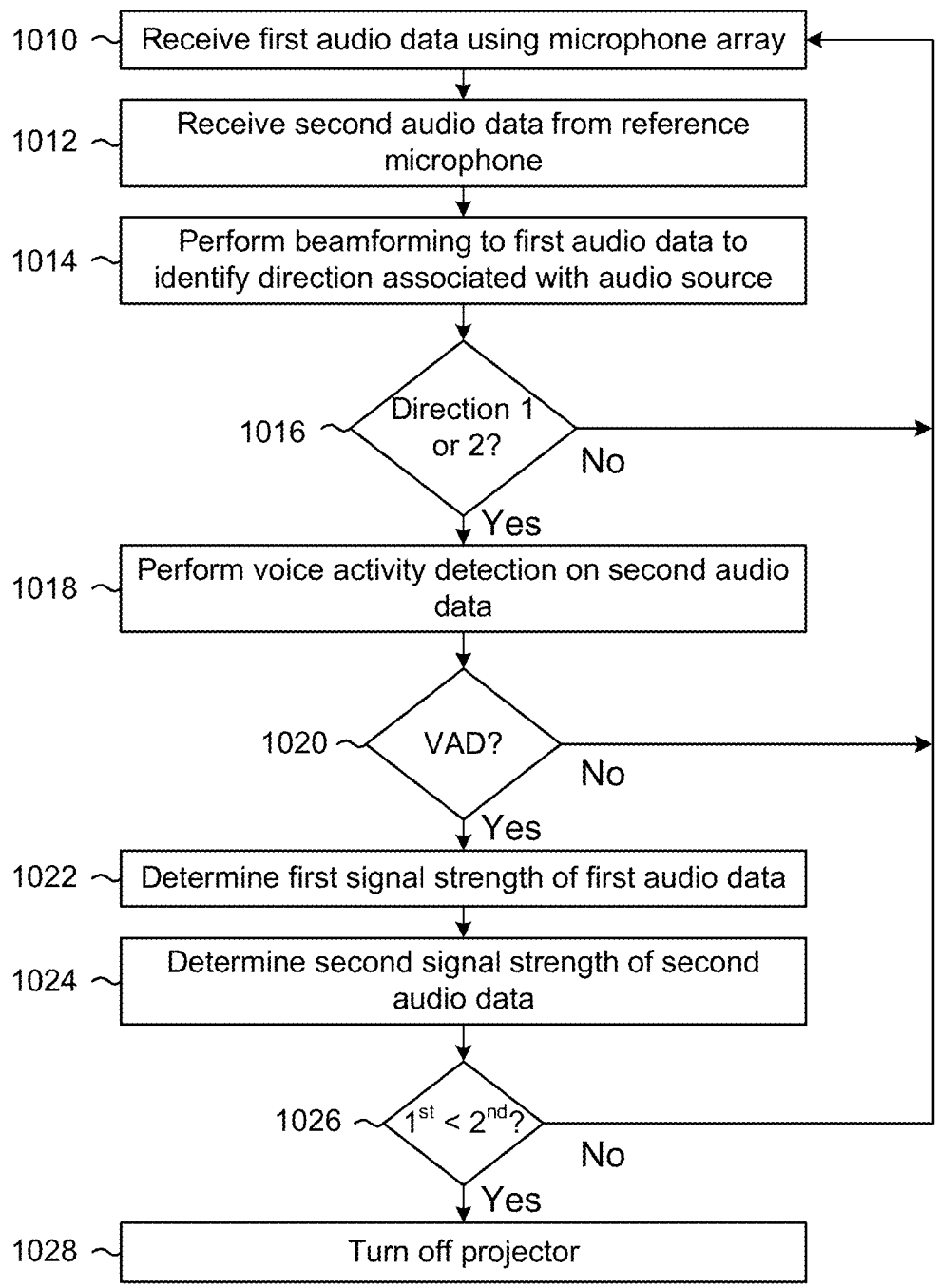
FIG. 10 is a flowchart conceptually illustrating an example method for turning off a projector in response to detecting human presence according to embodiments of the present disclosure.

FIG. 10 is a flowchart conceptually illustrating an example method for turning off a projector in response to detecting human presence according to embodiments of the present disclosure. As illustrated in FIG. 10, the device 110 may receive (1010) first audio at a using a microphone array and receive (1012) second audio data from a reference microphone. For example, the microphone array may correspond to microphones 118 positioned on a first surface of the device 110 (e.g., top surface) and the reference microphone may correspond to the reference microphone 118r positioned on a second surface of the device 110 (e.g., below the projector 116).

The device 110 may perform (1014) beamforming to the first audio data to identify a direction associated with the audio source and may determine (1016) whether the direction corresponds to a first direction or a second direction (e.g., first beam or a second beam). For example, the device 110 may determine whether the audio source is located in Direction 1 or Direction 2, as represented by directional audio 910 illustrated in FIG. 9.

While step 1016 corresponds to an example in which the beamforming separates the first audio data into four different directions, with the first direction and the second direction corresponding to the projector output zone 710, the disclosure is not limited thereto. Instead, the device 110 may perform beamforming using any number of different directions, may associate different and/or additional directions with the projector output zone 710, and/or the like without departing from the disclosure. Thus, step 1016 may correspond to identifying that the direction associated with the audio source corresponds to the projector output zone 710 even if the direction does not correspond to the first direction or the second direction without departing from the disclosure.

If the audio source is not located in the first direction or the second direction, the device 110 may determine that human presence is not detected in the projector output zone 710 and may loop to step 1010 to continue monitoring while leaving the projector 116 operating normally. If the device 110 determines that the audio source is located in the first direction or the second direction in step 1016, however, this indicates that the audio source may be in the projector output zone 710. Thus, the device 110 may perform (1018) voice activity detection (VAD) processing on the second audio data and determine (1020) whether voice activity is detected. For example, the device 110 may use voice activity detection to identify that a human is present near the reference microphone 118r. If voice activity is not detected, the device 110 may determine that human presence is not detected in the projector output zone 710 and may loop to step 1010 to continue monitoring while leaving the projector 116 operating normally.

If the device 110 detects voice activity in the second audio data in step 1020, the device 110 may determine (1022) a first signal strength value of the first audio data, may determine (1024) a second signal strength value of the second audio data, and may determine (1026) whether the first signal strength value is less than the second signal strength value. The device 110 may determine the first signal strength value and/or the second signal strength value using any techniques to measure a signal strength or other signal quality metric known to one of skill in the art without departing from the disclosure. For example, the device 110 may determine the first signal strength value based on an amount of energy associated with the first audio data. Additionally or alternatively, the device 110 may determine the first signal strength value based on a signal-to-noise ratio (SNR) value or other signal quality metric without departing from the disclosure.

If the device 110 determines that the first signal strength value is greater than the second signal strength value, this indicates that the audio source is closer to the microphone array than to the reference microphone and is therefore unlikely to be in the projector output zone 710. Thus, the device 110 may determine that human presence is not detected in the projector output zone 710 and may loop to step 1010 to continue monitoring while leaving the projector 116 operating normally.

If the device 110 determines that the second signal strength value is greater than the first signal strength value, this indicates that the audio source is closer to the reference microphone 118r than to the microphone array and is therefore likely to be in the projector output zone 710. Thus, the device 110 may turn (1028) off the projector 116 to ensure that the projector 116 is not shining a bright light at a face of the user within the projector output zone 710.

While FIG. 10 illustrates an example of comparing the first signal strength value directly to the second signal strength value in step 1026, the disclosure is not limited thereto. In some examples, the device 110 may multiply the first signal strength value by a coefficient value to determine a third signal strength value and may compare the second signal strength value to the third signal strength value. For example, the device 110 may multiply the first signal strength value by a factor that reduces the third signal strength value relative to the first signal strength value. The device 110 may store a fixed value for the coefficient value and the coefficient value may be selected to improve presence detection.

Figure 11:
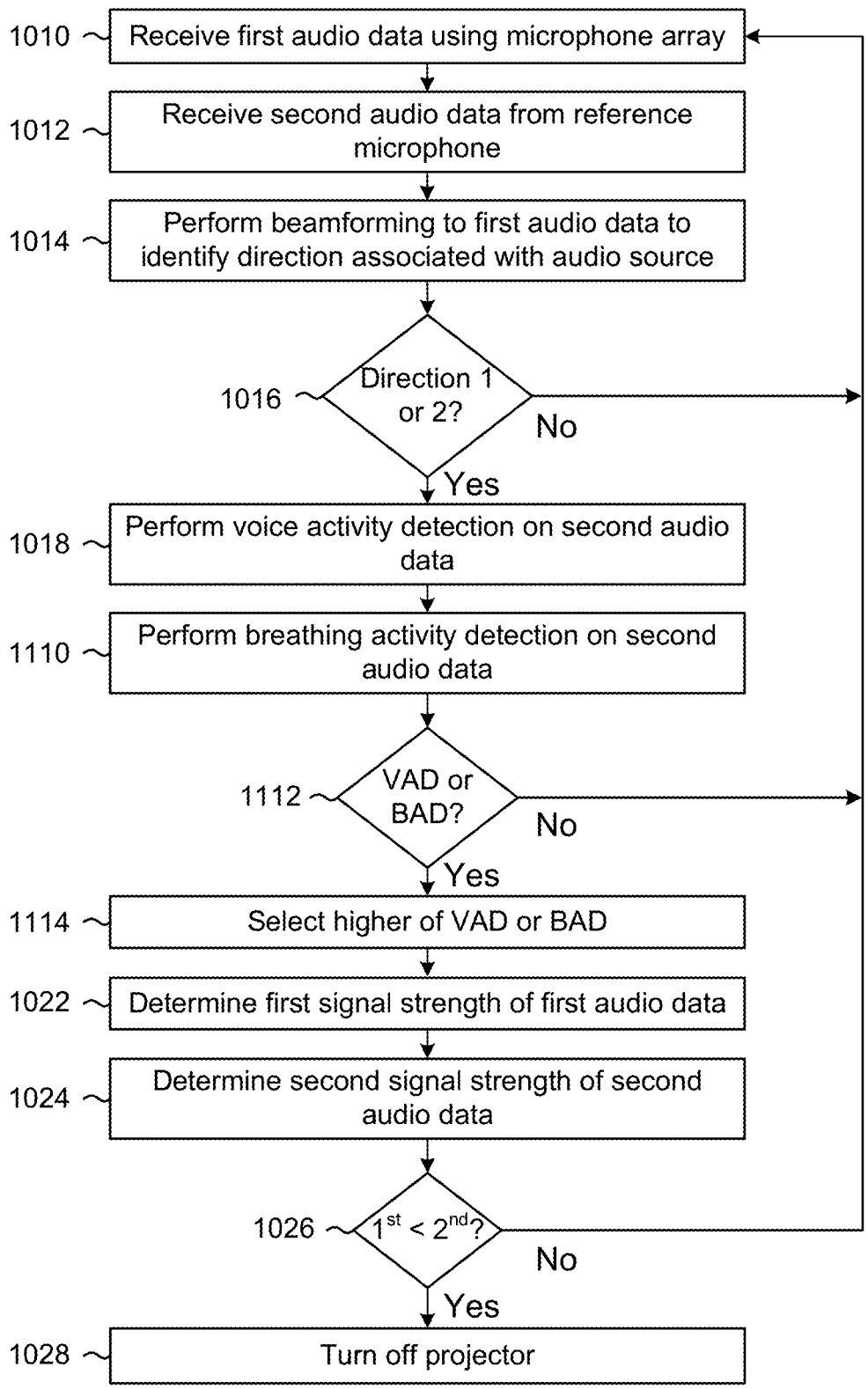
FIG. 11 is a flowchart conceptually illustrating an example method for turning off a projector in response to detecting human presence according to embodiments of the present disclosure.

FIG. 11 is a flowchart conceptually illustrating an example method for turning off a projector in response to detecting human presence according to embodiments of the present disclosure. The example method illustrated in FIG. 11 expands on the example method described above with regard to FIG. 12 by adding breathing activity detection (BAD) processing. Thus, some of the steps illustrated in FIG. 12 were described above with regard to FIG. 11 and a redundant description may be omitted.

Figure 12:
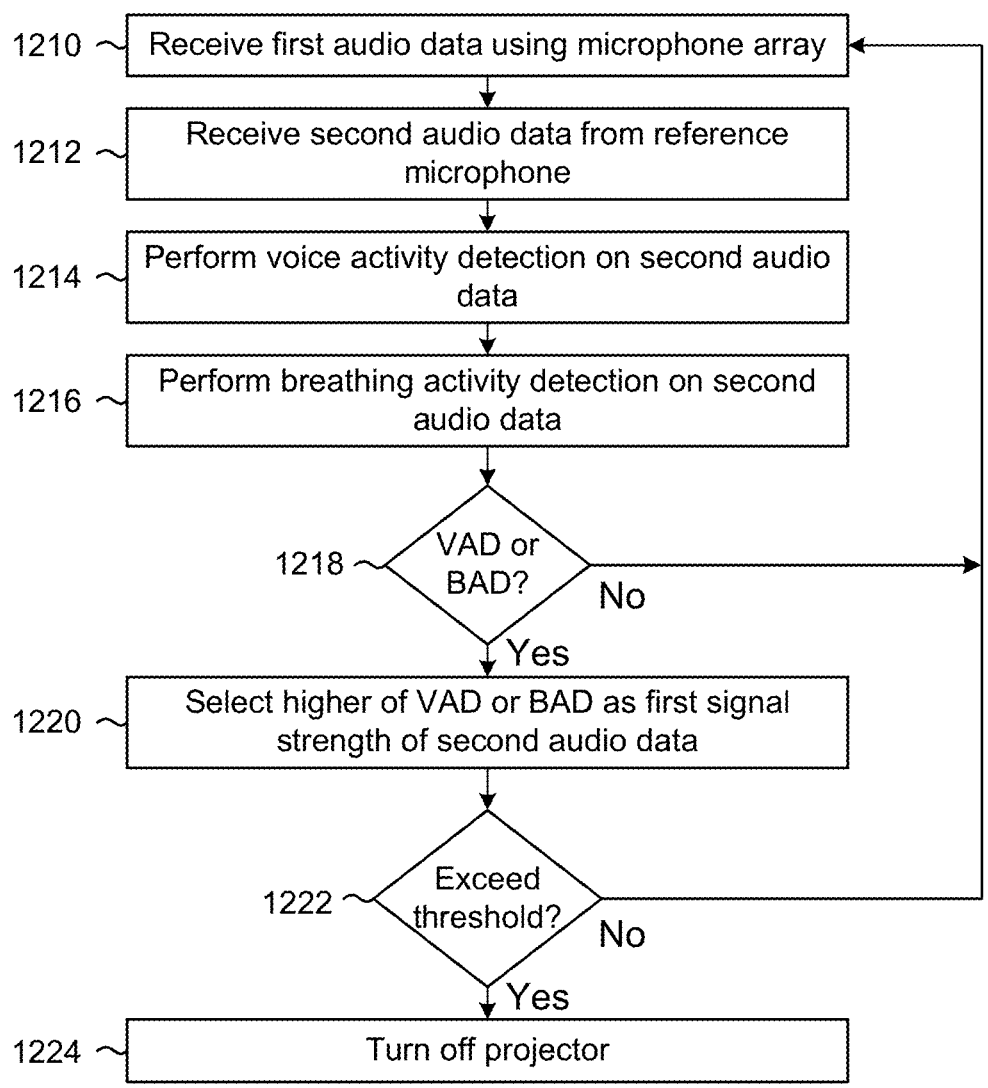
FIG. 12 is a flowchart conceptually illustrating an example method for turning off a projector in response to detecting human presence according to embodiments of the present disclosure.

As illustrated in FIG. 12, the device 110 may receive (1010) first audio data using the microphone array, receive (1012) second audio data from the reference microphone, perform (1014) beamforming to the first audio data to identify a direction associated with the audio source, determine (1016) whether the direction corresponds to the first direction or the second direction, and perform (1018) voice activity detection (VAD) processing on the second audio data, as described in greater detail above with regard to FIG. 11.

In addition, the device 110 may perform (1110) breathing activity detection (BAD) processing on the second audio data and may determine (1112) whether voice activity or breathing activity is detected. Breathing activity has unique features that may enable breathing activity to be detected. For example, normal respiratory sounds are cyclostationary and exhibit repetition of respiratory cycles which includes inspiratory and expiratory phase with inter-respiratory pause. In addition, a range of frequencies is evenly distributed between 100 Hz and 1000 Hz, except for wheezing sounds which are mainly between 250 Hz and 800 Hz. Typically, breathing phases are about 250 ms long.

In some examples, the device 110 may perform breathing activity detection by extracting potential breathing activity from the second audio data using a bandpass filter with a range between 100 Hz and 1000 Hz. The device 110 may then analyze the potential breathing activity extracted by the bandpass filter to identify portions of the second audio data in which an energy level exceeds a threshold value for a duration of time (e.g., 200 ms, although the disclosure is not limited thereto). The frequency range, threshold value, and/or the duration of time may vary without departing from the disclosure and may be selected to improve breathing activity detection. When the device 110 detects that portions of the second audio data are associated with this frequency range (e.g., 100 Hz to 1000 Hz) and have an energy level exceeding the threshold value for the selected duration of time, the device 110 may determine that breathing activity is represented in the second audio data (e.g., breathing activity is detected).

If the device 110 determines that neither voice activity nor breathing activity is detected in step 1112, the device 110 may loop to step 1010 and continue monitoring while leaving the projector 116 operating normally. If the device 110 detects voice activity and/or breathing activity in step 1112, however, the device 110 may select (1114) a higher of the voice activity or the breathing activity for additional processing. For example, the device 110 may select the stronger signal strength associated with the voice activity or the breathing activity, may select a portion of the second audio data corresponding to the voice activity or the breathing activity, and/or the like without departing from the disclosure. The device 110 may then determine (1022) the first signal strength of the first audio data, determine (1024) the second signal strength of the second audio data, determine (1026) whether the second signal strength is greater than the first signal strength, and may turn (1028) off the projector, as described in greater detail above with regard to FIG. 10.

FIG. 12 is a flowchart conceptually illustrating an example method for turning off a projector in response to detecting human presence according to embodiments of the present disclosure. As illustrated in FIG. 12, the device 110 may receive (1210) first audio data using the microphone array and may receive (1212) second audio data from the reference microphone. The device 110 may perform (1214) voice activity detection on the second audio data, may perform (1216) breathing activity detection on the second audio data, and may determine (1216) whether voice activity or breathing activity is detected, as described in greater detail above with regard to FIG. 11.

If the device 110 does not detect voice activity or breathing activity, the device 110 may loop to step 1210 to continue monitoring while leaving the projector 116 operating normally. However, if the device 110 detects voice activity or breathing activity, the device 110 may select (1220) a higher signal strength associated with the voice activity or the breathing activity as a first signal strength value of the second audio data and may determine (1222) whether the first signal strength value exceeds a threshold value. If the first signal strength value does not exceed the threshold value, the device 110 may loop to step 1210 to continue monitoring while leaving the projector 116 operating normally. However, if the device 110 determines that the first signal strength value exceeds the threshold value, the device 110 may turn (1224) off the projector to avoid shining a bright light in the user's face.

Figure 13A:
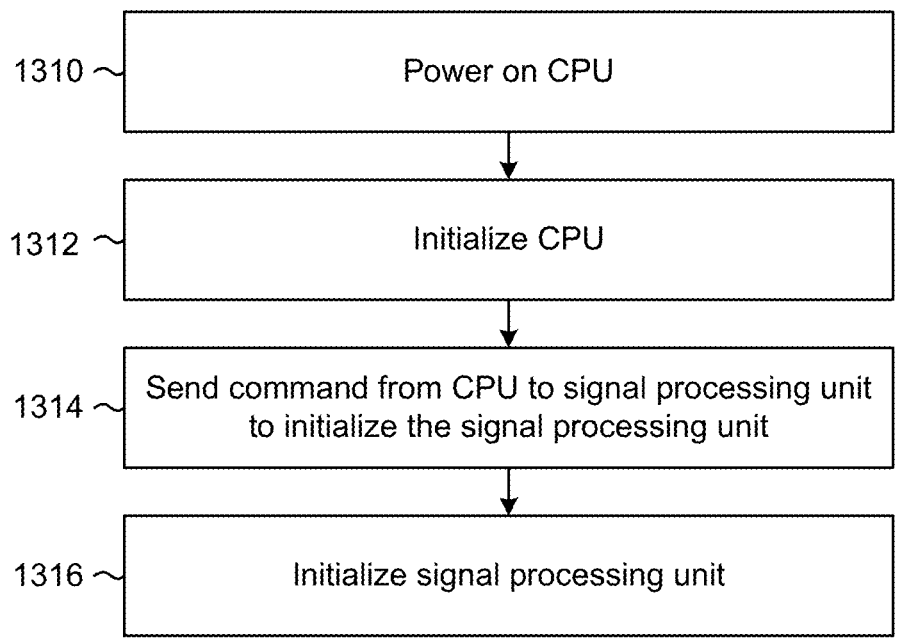
FIGS. 13A-13B are flowcharts conceptually illustrating example methods for initializing a central processing unit (CPU) component and a signal processing component according to embodiments of the present disclosure.
Figure 13B:
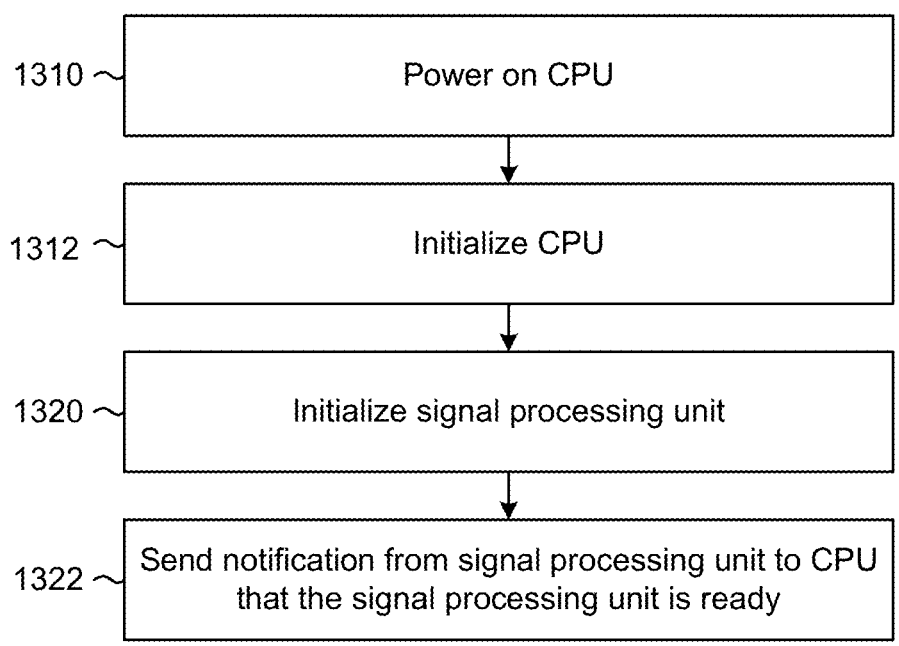

FIGS. 13A-13B are flowcharts conceptually illustrating example methods for initializing a central processing unit (CPU) component and a signal processing component according to embodiments of the present disclosure. As illustrated in FIG. 13A, in some examples the device 110 may power (1310) on the CPU component 112 and may initialize (1312) the CPU component 112. For example, the device 110 may power on the CPU component 112 in response to a user pressing a power button or other input. The device 110 may initialize the CPU component 112 by turning on advanced state machines and/or other processes running on the CPU component 112 and establishing a first state (e.g., initial state for the CPU component 112).

In some examples, the device 110 may send (1314) a command from the CPU component 112 to the signal processing unit 114 to initialize the signal processing unit 114, and may initialize (1316) the signal processing unit 114 in response to the command. Thus, the CPU component 112 may directly command the signal processing unit 114 to initialize. The device 110 may initialize the signal processing unit 114 by turning on simple state machines and/or other processes running on the signal processing unit 114 and establishing a second state (e.g., initial state for the signal processing unit 114).

The disclosure is not limited thereto, however, and in other examples the signal processing unit 114 may initialize itself without receiving a command from the CPU component 112. As illustrated in FIG. 13B, the device 110 may power (1310) on the CPU component 112 and may initialize (1312) the CPU component 112, as described above with regard to FIG. 13A. However, after initializing, the CPU component 112 may wait to receive a signal from the signal processing unit 114. For example, the device 110 may initialize (1320) the signal processing unit 114 and then may send (1322) a notification from the signal processing unit 114 to the CPU component 112 indicating that the signal processing unit 114 is ready. Thus, the signal processing unit 114 may independently come online and send an indication to the CPU component 112 when it is ready to begin executing the simple state machines. As described above, the device 110 may initialize the signal processing unit 114 by turning on simple state machines and/or other processes running on the signal processing unit 114 and establishing a second state (e.g., initial state for the signal processing unit 114).

Figure 14A:
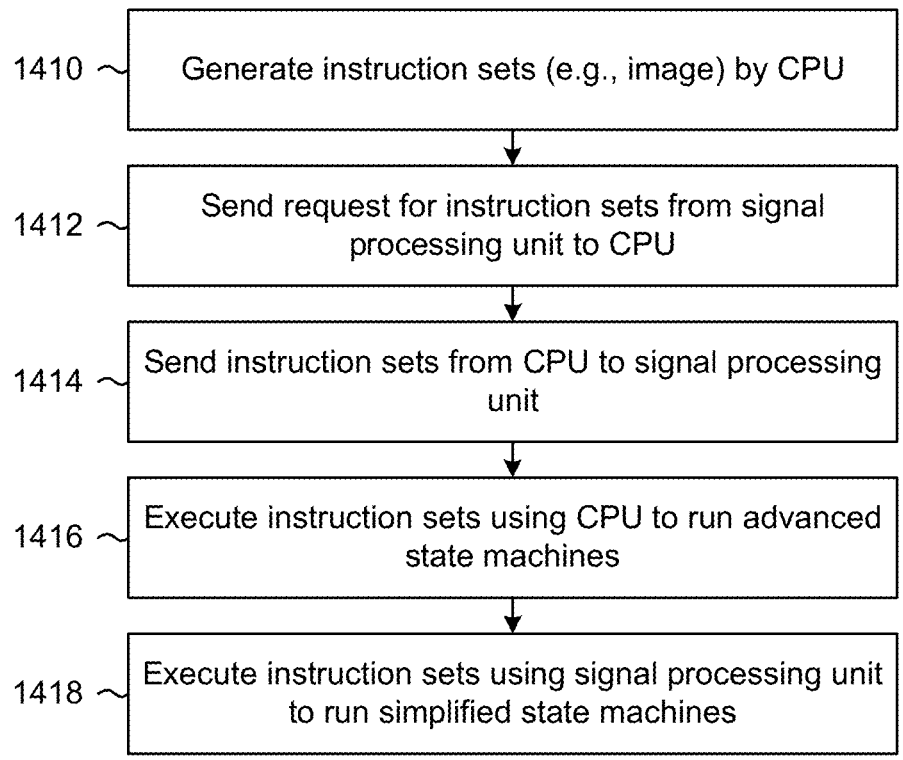
FIGS. 14A-14B are flowcharts conceptually illustrating example methods for executing advanced state machines and simple state machines according to embodiments of the present disclosure.
Figure 14B:
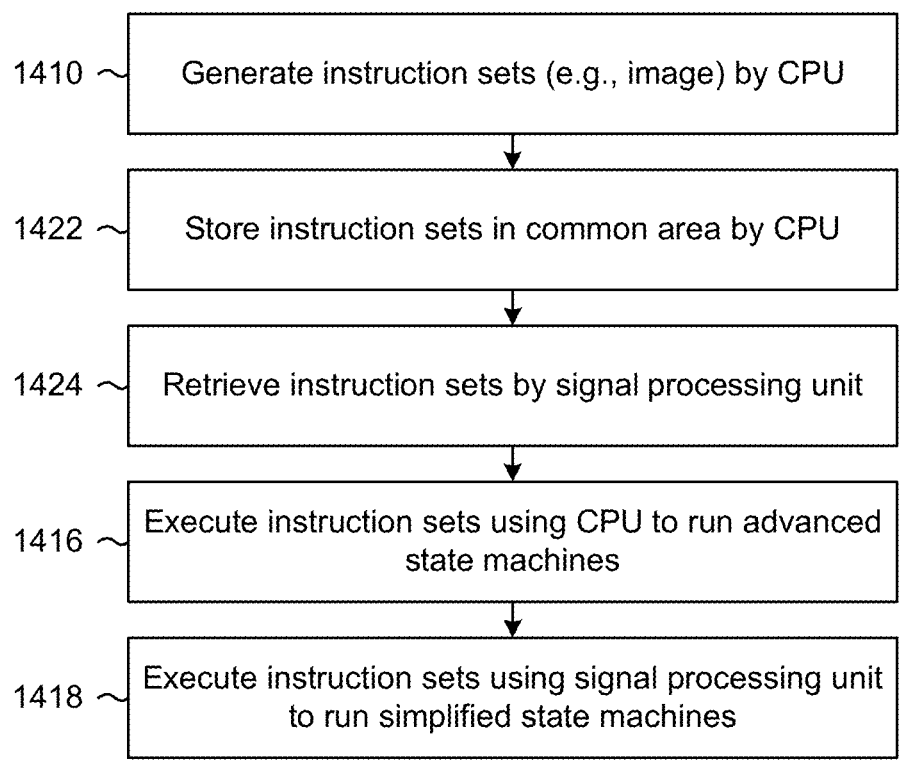

FIGS. 14A-14B are flowcharts conceptually illustrating example methods for executing advanced state machines and simple state machines according to embodiments of the present disclosure. As illustrated in FIG. 14A, the device 110 may generate (1410) instruction sets (e.g., configuration file, which may be known in the art as an image) by the CPU component 112. The instruction sets may include an operating system and other instructions to execute associated with the CPU component 112 and/or the signal processing unit 114, although the disclosure is not limited thereto.

As illustrated in FIG. 14A, in some examples the device 110 may send (1412) a request for the instruction sets from the signal processing unit 114 to the CPU component 112 and may send (1414) the instruction sets from the CPU component 112 to the signal processing unit 114 in response to the request. Thus, in some examples the signal processing unit 114 may request the instruction sets from the CPU component 112, although the disclosure is not limited thereto. For example, the CPU component 112 may wait for the signal processing unit 114 to initialize and send the request for the instruction sets and then may directly send the instruction sets to the signal processing unit 114.

Using the instruction sets, the device 110 may execute (1416) the instruction sets using the CPU component 112 to run advanced state machines and may execute (1418) the instruction sets using the signal processing unit to run simplified state machines (e.g., simple state machines). The device 110 may initialize the advanced state machines by starting the advanced state machines and establishing a first state (e.g., initial state for the CPU component 112). Similarly, the device 110 may initialize the simple state machines by starting the simple state machines and establishing a second state (e.g., initial state for the signal processing unit 114).

The disclosure is not limited thereto, however, and in other examples the CPU component 112 may distribute the instruction sets to the signal processing unit 114 indirectly without departing from the disclosure. As illustrated in FIG. 14B, in other examples the device 110 may generate (1410) the instruction sets (e.g., image) by the CPU component 112, may store (1422) the instruction sets in a common area (e.g., within a storage component) using the CPU component 112, and may retrieve (1424) the instruction sets by the signal processing unit 114. Thus, the CPU component 114 may store the instruction sets to a common area of the device 110 to enable the signal processing unit 114 to retrieve the instruction sets when it is ready to execute the simplified state machines.

Using the instruction sets, the device 110 may execute (1416) the instruction sets using the CPU component 112 to run advanced state machines and may execute (1418) the instruction sets using the signal processing unit 114 to run simplified state machines (e.g., simple state machines), as described above with regard to FIG. 14A.

Figure 15A:
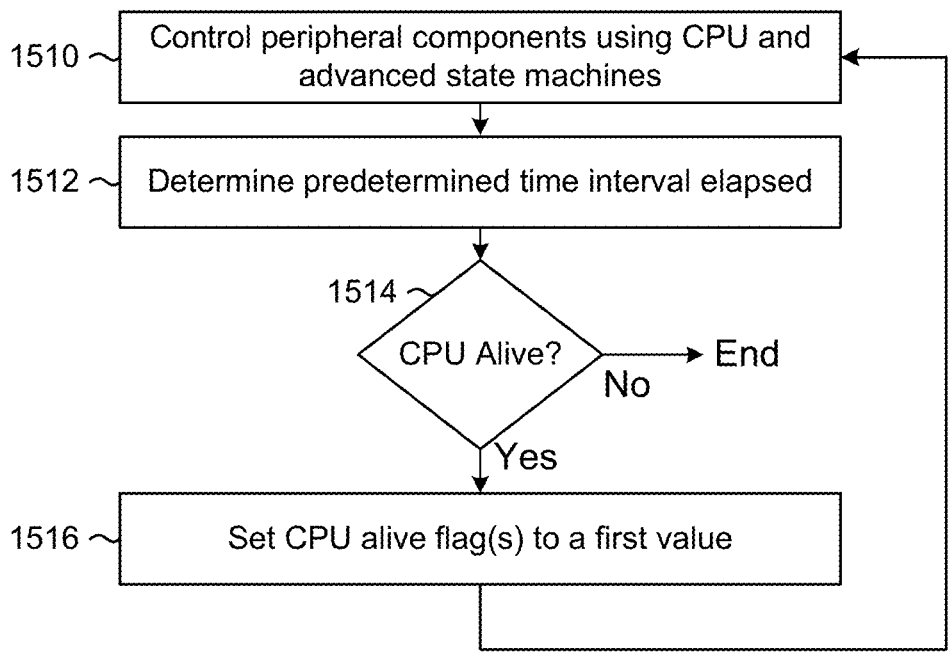
FIGS. 15A-15B are flowcharts conceptually illustrating example methods for controlling peripheral components using a CPU component when the CPU component is operating normally and controlling the peripheral components using a signal processor when the CPU component is not operating normally according to embodiments of the present disclosure.
Figure 15B:
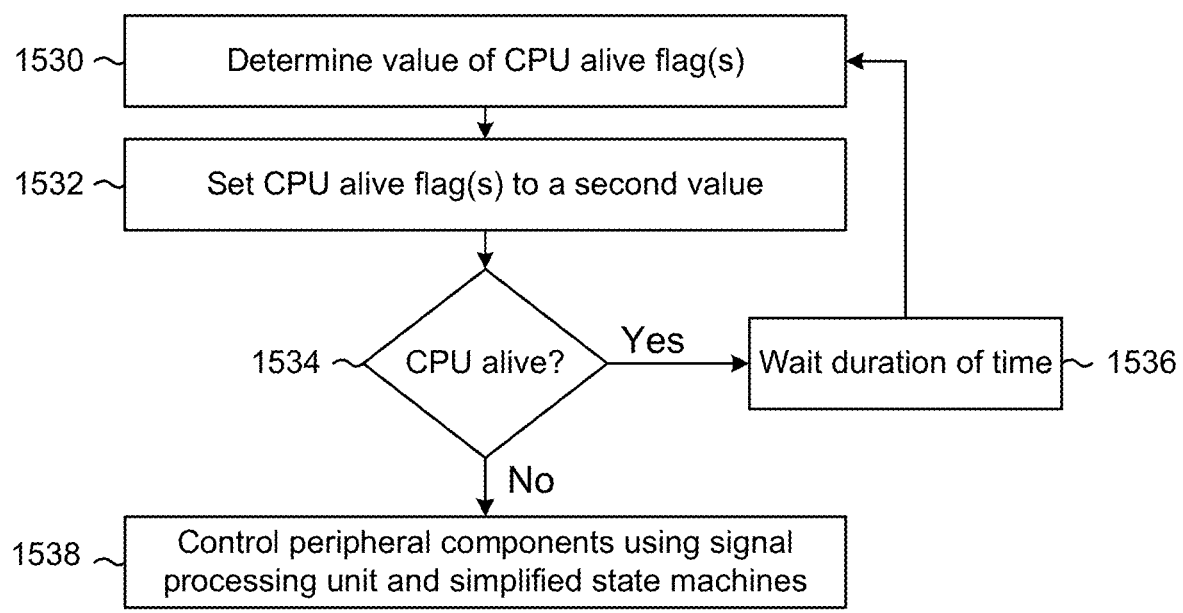

FIGS. 15A-15B are flowcharts conceptually illustrating example methods for controlling peripheral components using a CPU component when the CPU component is operating normally and controlling the peripheral components using a signal processor when the CPU component is not operating normally according to embodiments of the present disclosure. As illustrated in FIG. 15A, the device 110 may control (1510) peripheral components using the CPU component 112 and advanced state machines.

Periodically, the device 110 may set a keepalive flag indicating that the CPU component 112 is operating. For example, the device 110 may determine (1512) that a predetermined time interval has elapsed and may determine (1514) whether the CPU component 112 is alive. For example, the device 110 may determine whether the CPU component 112 is operating normally (e.g., operating in a first mode), although the disclosure is not limited thereto and this step may be performed implicitly when the CPU component 112 is operating normally. If the CPU component 112 is not alive (e.g., operating in a second mode), the method may end after step 1514.

If the CPU component 112 is alive (e.g., operating in the first mode), the device 110 may set (1516) CPU alive flag(s) to a first value (e.g., first binary value, such as "1"), indicating that the CPU component 112 is alive and operating normally, and then loop to step 1510 and repeat steps 1510-1516.

While FIG. 15A illustrates the device 110 performing step 1514 as an explicit step of determining whether the CPU component 112 is alive, this is intended to conceptually illustrate how the device 110 functions when the CPU component 112 is operating normally or not. However, the disclosure is not limited thereto and in some examples the device 110 may not explicitly determine whether the CPU is alive in step 1514 without departing from the disclosure. For example, if the CPU component 112 is operating normally the device 110 may implicitly determine that the CPU component 112 is alive and set the CPU alive flag(s) in step 1516. In contrast, if the CPU component 112 is not operating, the CPU component 112 may stop updating the CPU alive flag(s) without first making an explicit determination that the CPU component 112 is not operating without departing from the disclosure.

In some examples, the device 110 may set a separate CPU alive flag for each state machine of the advanced state machines. For example, the CPU component 112 may set a first CPU alive flag for the projector state machine (e.g., projector monitoring advanced state machine 615), a second CPU alive flag for the CPU state machine (e.g., CPU monitoring advanced state machine 620), a third CPU alive flag for the microphone state machine (e.g., microphone monitoring advanced state machine 625), and a fourth CPU alive flag for the loudspeaker state machine (e.g., loudspeaker monitoring advanced state machine 630), although the disclosure is not limited thereto.

As illustrated in FIG. 15B, the device 110 may determine (1530) a value of the CPU alive flag(s) and may set (1532) the CPU alive flag(s) to a second value (e.g., second binary value, such as "0"). For example, the device 110 may perform a clear-on-read operation so that the CPU alive flag(s) reset to the second value every time the CPU alive flag(s) are read. However, the disclosure is not limited thereto and the device 110 may set the CPU alive flag(s) using any techniques without departing from the disclosure. Additionally or alternatively, the first value and the second value may vary without departing from the disclosure and the first value may correspond to the second binary value and the second value may correspond to the first binary value without departing from the disclosure.

The device 110 may determine (1534) whether the CPU component 112 is alive (e.g., CPU alive flag(s) were set to the first value) and, if so, may wait (1536) a duration of time and loop to step 1530 to repeat steps 1530-1534. Thus, while the CPU component 112 is operating normally in the first mode, the signal processing unit 114 may continually check the CPU alive flag(s) periodically but leave control of the peripheral components to the CPU component 112.

If the device 110 determines that the CPU component 112 is not alive in step 1534 (e.g., CPU component 112 is operating in the second mode, indicated by the CPU alive flag(s) being set to the second value), the device 110 may control (1538) the peripheral components using the signal processing unit 114 and the simplified state machines.

To illustrate a detailed example, the projector state machine for the signal processing unit 114 (e.g., projector monitoring simple state machine 655) may read the first CPU alive flag and determine whether the CPU component 112 is operating in the first mode. If the first CPU alive flag corresponds to the first value, indicating that the CPU component 112 is operating normally in the first mode, the projector state machine may set the first CPU alive flag to the second value and wait for the duration of time. Thus, the simple projector state machine may repeatedly reset the first CPU alive flag (e.g., set to the second value) and the advanced projector state machine may repeatedly set the first CPU alive flag (e.g., set to the first value) as long as the CPU component 112 is operating normally in the first mode.

If the CPU component 112 stops operating normally in the first mode, the advanced projector state machine will not set the first CPU alive flag to the first value and the simple projector state machine will determine that the CPU component 112 is not operating in the first mode and will control the peripheral components (e.g., perform action tasks associated with the projector 116).

Similarly, the simple CPU state machine will read and reset the second CPU alive flag (e.g., set to the second value) and the advanced CPU state machine will set the second CPU alive flag (e.g., set to the first value), the simple microphone state machine will read and reset the third CPU alive flag (e.g., set to the second value) and the advanced microphone state machine will set the third CPU alive flag (e.g., set to the first value), and the simple loudspeaker state machine will read and reset the fourth CPU alive flag (e.g., set to the second value) and the advanced loudspeaker state machine will set the fourth CPU alive flag (e.g., set to the first value). If any of the simple state machines determine that the CPU alive flag(s) are set to the second value, the simple state machine will take control of a corresponding peripheral component(s) and/or perform action tasks associated with the corresponding peripheral component(s).

While FIGS. 15A-15B illustrate examples of the device 110 setting a CPU alive flag, the disclosure is not limited thereto. In some examples, the CPU component 112 may send a keepalive message or other indication that the CPU component 112 is operating normally to the signal processing unit 114 without departing from the disclosure.

FIGS. 16A-16B are communication diagrams conceptually illustrating example methods for controlling peripheral components using a CPU component when the CPU component is operating normally and controlling the peripheral components using a signal processor when the CPU component is not operating normally according to embodiments of the present disclosure. As illustrated in FIG. 16A, the CPU component 112 may control (1610) peripheral components using advanced state machines and may set (1614) the CPU alive flag(s) 1602 to the first value. In some examples, the CPU component 112 may set the CPU alive flag(s) as part of a keepalive message to indicate to the signal processing unit 114 and/or other components that the CPU component 112 is operating normally. For example, the CPU component 112 may update a status register, flag register, and/or the like at predefined intervals during normal processing operations to indicate the current state of the processor.

In some examples, the CPU component 112 may set a single CPU alive flag to the first value and multiple state machines and/or components may refer to the same CPU alive flag. However, the disclosure is not limited thereto, and in other examples the CPU component 112 may set a separate CPU alive flag for each of the simple state machines without departing from the disclosure, as described in greater detail below.

Periodically, the signal processing unit 114 may retrieve (1614) values from the CPU alive flag(s) 1602, may set (1616) the CPU alive flag(s) 1602 to a second value, and may determine (1618) that the CPU alive flag(s) indicate that the CPU component 112 is alive. For example, the signal processing unit 114 may determine that the values retrieved from the CPU alive flag(s) correspond to the first value, which indicates that the CPU component 112 is operating normally. Thus, the signal processing unit 114 may do nothing and enable the CPU component 112 to continue controlling the peripheral components.

During normal operation, the CPU component 112 may determine (1620) that a first duration of time has elapsed (e.g., since setting the CPU alive flag(s) in step 1612) and may set (1622) the CPU alive flag(s) to the first value. For example, the CPU component 112 may set the CPU alive flag(s) to the first value at predefined intervals during normal operation.

The signal processing unit 114 may determine (1624) that a second duration of time has elapsed (e.g., since retrieving the CPU alive flag(s) in step 1614), may retrieve (1626) the CPU alive flag(s) 1602, may set (1628) the CPU alive flag(s) 1602 to the second value, and may determine (1630) that the CPU alive flag(s) indicate that the CPU component 112 is alive. For example, the signal processing unit 114 may determine that the values retrieved from the CPU alive flag(s) correspond to the first value, which indicates that the CPU component 112 is operating normally.

FIG. 16B illustrates what happens when the CPU component 112 stops functioning normally (e.g., operating in the first mode). As illustrated in FIG. 16B, the CPU component 112 and the signal processing unit 114 may perform steps 1610-1618, as described above with regard to FIG. 16A. In this example, however, the CPU component 112 does not perform steps 1620-1622 to set the CPU alive flag(s) to the first value within the second duration of time. Thus, the CPU alive flag(s) correspond to the second value by the signal processing unit 114 set in step 1616.

As illustrated in FIG. 16B, the signal processing unit 114 may determine (1650) that the second duration of time has elapsed (e.g., since retrieving the CPU alive flag(s) in step 1614), may retrieve (1652) values from the CPU alive flag(s) 1602, may set (1654) the CPU alive flag(s) 1602 to a second value, and may determine (1656) that the CPU alive flag(s) indicate that the CPU component 112 is not alive (e.g., the CPU component 112 is operating in the second mode). Thus, the signal processing unit 114 may control (1658) the peripheral components using the simplified state machines.

Figure 17:
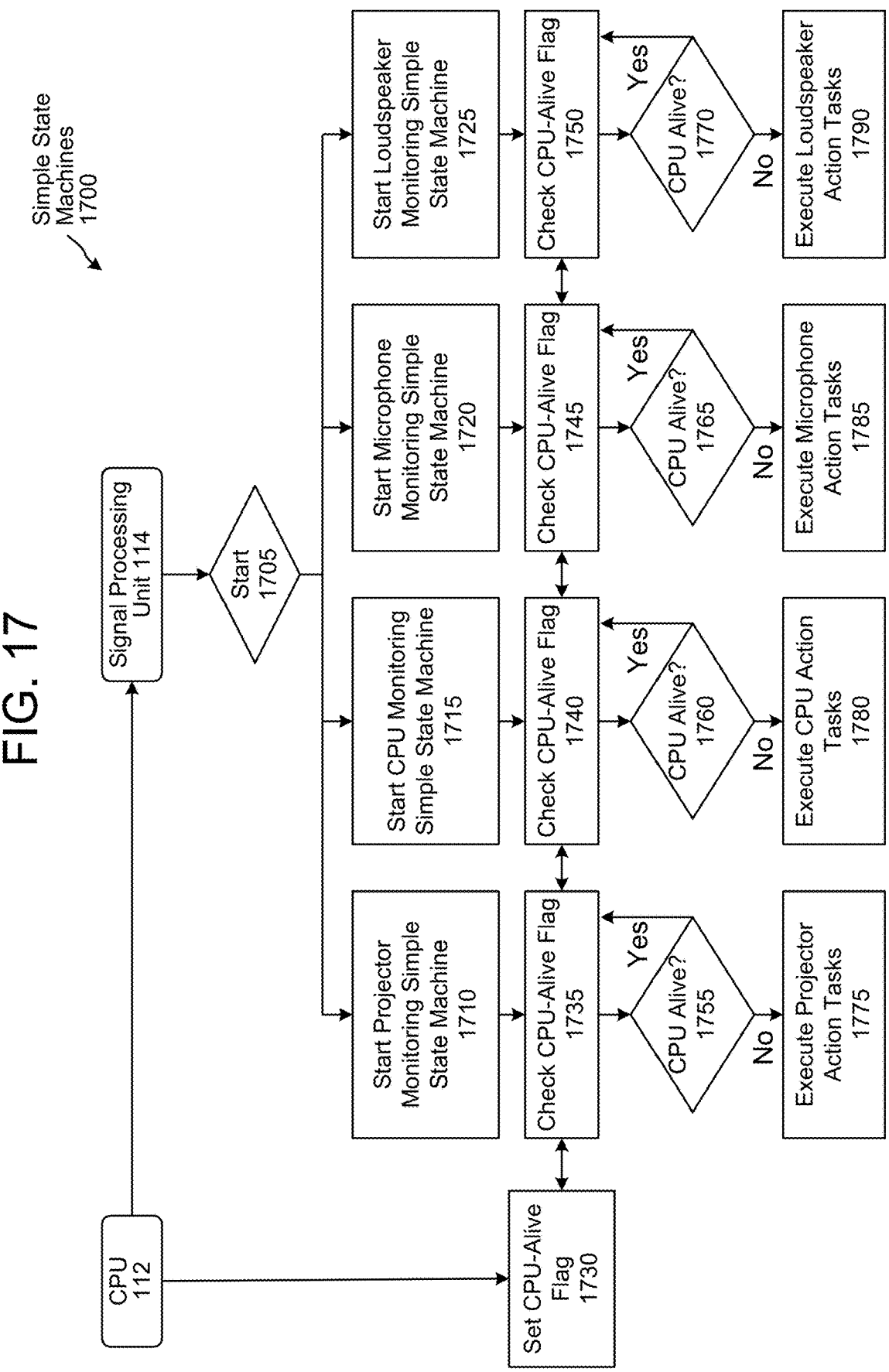
FIG. 17 is a conceptual diagram illustrating an example of transitioning to simple state machines according to embodiments of the present disclosure.

FIG. 17 is a conceptual diagram illustrating an example of transitioning to simple state machines according to embodiments of the present disclosure. FIG. 17 illustrates an example of simple state machines 1700 associated with the signal processing unit 114. As illustrated in FIG. 17, the signal processing unit 114 may start (1705) up normal operation (e.g., initialize) and then may start (1710) a projector monitoring simple state machine, start (1715) a CPU monitoring simple state machine, start (1720) a microphone monitoring simple state machine, and start (1725) a loudspeaker monitoring simple state machine, along with additional simple state machines without departing from the disclosure.

While the signal processing unit 114 starts the simple state machines 1700 in steps 1710-1725, the simple state machines 1700 do nothing while the CPU component 112 is operating normally. This is represented in FIG. 17 as the CPU component 112 setting a CPU-alive flag at a first predefined interval so that the signal processing unit 114 may determine whether the CPU component 112 is operating normally. For example, if the CPU component 112 continues to set the CPU-alive flag 1730, the signal processing unit 114 defers to the CPU component 112 and the advanced state machines running on the CPU component 112. However, if the CPU component 112 fails to set the CPU-alive flag 1730 for a duration of time, the signal processing unit 114 may detect that the CPU-alive flag 1730 is not set and may take control using the simple state machines 1700.

As illustrated in FIG. 17, the CPU component 112 may set (1730) a CPU-alive flag at a first predefined interval. The projector monitoring simple state machine may check (1735) the CPU-alive flag at a second predefined interval and determine (1755) whether the CPU-alive flag indicates that the CPU component 112 is operating normally. If the CPU-alive flag is set, indicating that the CPU component 112 is continuing to set the CPU-alive flag at the first predefined interval, the projector monitoring simple state machine may loop to step 1735 and continue to check the CPU-alive flag at the second predefined interval. If the CPU-alive flag is not set, indicating that the CPU component 112 did not set the CPU-alive flag for a duration of time and is therefore not operating normally, the projector monitoring simple state machine may execute (1775) projector action tasks, as described in greater detail below.

The CPU monitoring simple state machine may check (1740) the CPU-alive flag at the second predefined interval and determine (1760) whether the CPU-alive flag indicates that the CPU component 112 is operating normally. If the CPU-alive flag is set, indicating that the CPU component 112 is continuing to set the CPU-alive flag at the first predefined interval, the CPU monitoring simple state machine may loop to step 1740 and continue to check the CPU-alive flag at the second predefined interval. If the CPU-alive flag is not set, indicating that the CPU component 112 did not set the CPU-alive flag for a duration of time and is therefore not operating normally, the CPU monitoring simple state machine may execute (1780) CPU action tasks, as described in greater detail below.

The microphone monitoring simple state machine may check (1745) the CPU-alive flag at the second predefined interval and determine (1765) whether the CPU-alive flag indicates that the CPU component 112 is operating normally. If the CPU-alive flag is set, indicating that the CPU component 112 is continuing to set the CPU-alive flag at the first predefined interval, the microphone monitoring simple state machine may loop to step 1745 and continue to check the CPU-alive flag at the second predefined interval. If the CPU-alive flag is not set, indicating that the CPU component 112 did not set the CPU-alive flag for a duration of time and is therefore not operating normally, the microphone monitoring simple state machine may execute (1785) microphone action tasks, as described in greater detail below.

The loudspeaker monitoring simple state machine may check (1750) the CPU-alive flag at the second predefined interval and determine (1770) whether the CPU-alive flag indicates that the CPU component 112 is operating normally. If the CPU-alive flag is set, indicating that the CPU component 112 is continuing to set the CPU-alive flag at the first predefined interval, the loudspeaker monitoring simple state machine may loop to step 1750 and continue to check the CPU-alive flag at the second predefined interval. If the CPU-alive flag is not set, indicating that the CPU component 112 did not set the CPU-alive flag for a duration of time and is therefore not operating normally, the loudspeaker monitoring simple state machine may execute (1790) loudspeaker action tasks, as described in greater detail below.

In some examples, the CPU component 112 may set a single CPU-alive flag in step 1730 and each of the simple state machines 1700 may check the same CPU-alive flag. For example, one of the simple state machines, the signal processing unit 114, and/or a different component may reset the CPU-alive flag at a predefined interval by setting the CPU-alive flag to a first value (e.g., 0). During normal operation, the CPU component 112 may set the CPU-alive flag to a second value (e.g., 1) at the first predefined interval.

Thus, when each of the simple state machines 1700 checks the CPU-alive flag, detecting the first value indicates that the CPU component 112 did not set the CPU-alive flag and is not operating normally, while detecting the second value indicates that the CPU component 112 set the CPU-alive flag and is operating normally.

The disclosure is not limited thereto, however, and in some examples the CPU component 112 may set multiple CPU-alive flags without departing from the disclosure. For example, the CPU component 112 may set a CPU-alive flag for each of the simple state machines 1700. Thus, the CPU component 112 may set a first CPU-alive flag for the projector monitoring simple state machine, a second CPU-alive flag for the CPU monitoring simple state machine, a third CPU-alive flag for the microphone monitoring simple state machine, and a fourth CPU-alive flag for the loudspeaker monitoring simple state machine without departing from the disclosure.

To illustrate a detailed example, the CPU component 112 may set the first CPU-alive flag associated with the projector monitoring simple state machine to the second value at a first time. The projector monitoring simple state machine may check the first CPU-alive flag at a second time, detect that the first CPU-alive flag is set to the second value at the second time, and then may set the first CPU-alive flag to the first value. Thus, the projector monitoring simple state machine interprets the second value as indicating that the CPU component 112 is operating normally and then resets the first CPU-alive flag to the first value. If the CPU component 112 fails to set the first CPU-alive flag to the second value within a duration of time, the projector monitoring simple state machine may check the first CPU-alive flag at a third time, detect that the first CPU-alive flag is set to the first value at the third time, interpret the first value as indicating that the CPU component 112 is not operating normally and then execute the projector action tasks.

Figure 18:
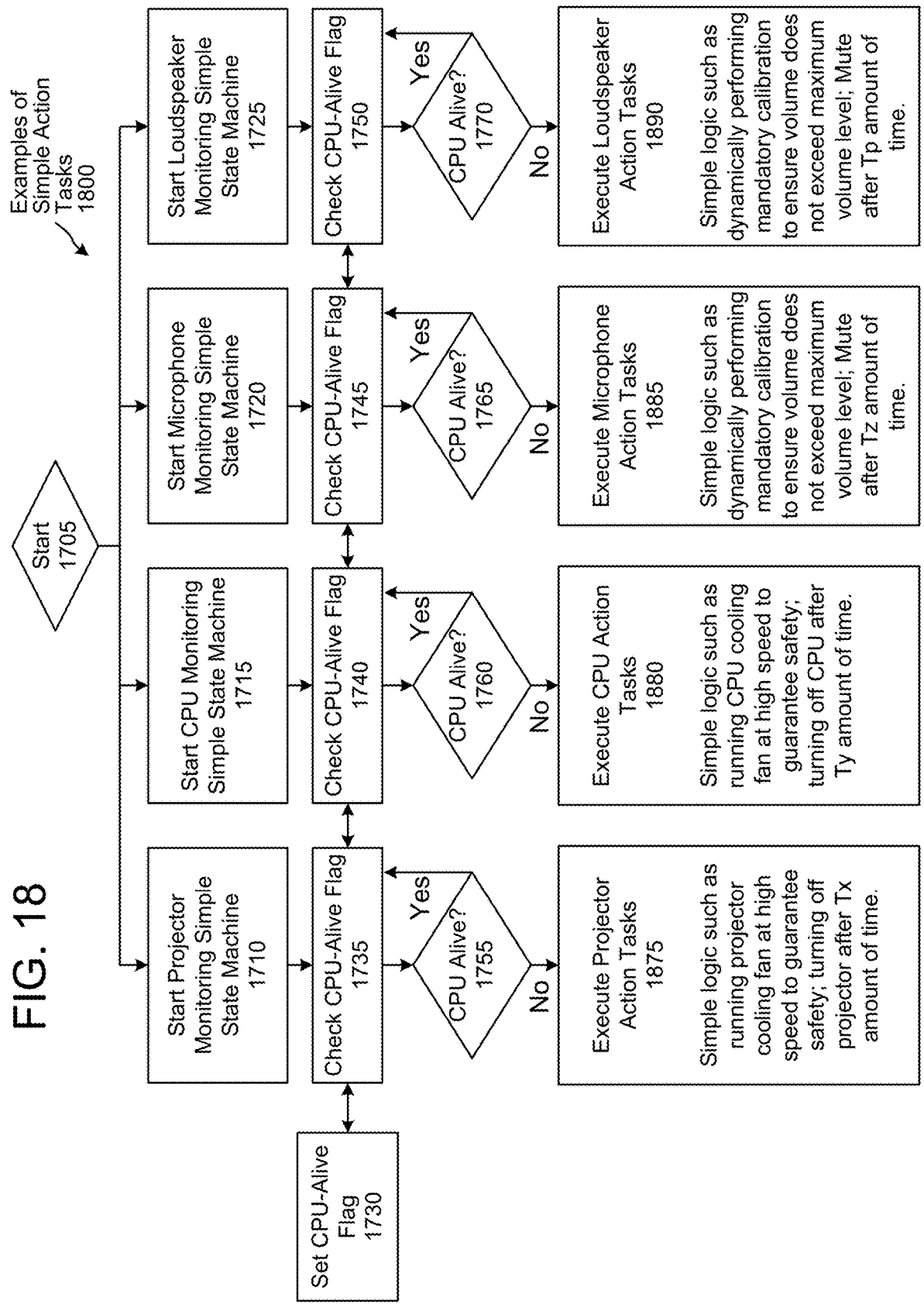
FIG. 18 is a conceptual diagram illustrating examples of executing simple action tasks according to embodiments of the present disclosure.

FIG. 18 is a conceptual diagram illustrating examples of executing simple action tasks according to embodiments of the present disclosure. FIG. 18 illustrates an example in which the simple state machines 1700 operate as described above with regard to FIG. 17, except with additional details about the action tasks performed by the simple state machines 1700. Thus, FIG. 18 illustrates examples of simple action tasks 1800 that are performed by the simple state machines 1700 when the CPU component 112 does not set the CPU-alive flag(s) within a duration of time. As several components illustrated in FIG. 18 are described above with regard to FIG. 17, a redundant description is omitted.

As illustrated in FIG. 18, if the projector monitoring simple state machine determines that the CPU is not alive (e.g., first CPU-alive flag is not set), indicating that the CPU component 112 is not operating normally, the projector monitoring simple state machine may execute (1875) projector action tasks. For example, the projector monitoring simple state machine may perform simple logic such as running the projector cooling fan at high speed to ensure temperature control, turning off the projector after a first amount of time $T_x$, and/or the like.

Similarly, if the CPU monitoring simple state machine determines that the CPU is not alive (e.g., second CPU-alive flag is not set), indicating that the CPU component 112 is not operating normally, the CPU monitoring simple state machine may execute (1880) CPU action tasks. For example, the CPU monitoring simple state machine may perform simple logic such as running the CPU cooling fan at high speed to ensure temperature control, turning off the CPU after a second amount of time $T_y$, and/or the like.

If the microphone monitoring simple state machine determines that the CPU is not alive (e.g., third CPU-alive flag is not set), indicating that the CPU component 112 is not operating normally, the microphone monitoring simple state machine may execute (1885) microphone action tasks. For example, the microphone monitoring simple state machine may perform simple logic such as dynamically performing mandatory calibration to ensure that an input volume level does not exceed a maximum volume level, mute the microphone (e.g., turn off the microphone) after a third amount of time $T_z$, and/or the like.

If the loudspeaker monitoring simple state machine determines that the CPU is not alive (e.g., fourth CPU-alive flag is not set), indicating that the CPU component 112 is not operating normally, the loudspeaker monitoring simple state machine may execute (1890) loudspeaker action tasks. For example, the loudspeaker monitoring simple state machine may perform simple logic such as dynamically performing mandatory calibration to ensure that an output volume level does not exceed a maximum volume level, mute the loudspeaker (e.g., turn off the loudspeaker) after a fourth amount of time $T_p$, and/or the like.

Figure 19:
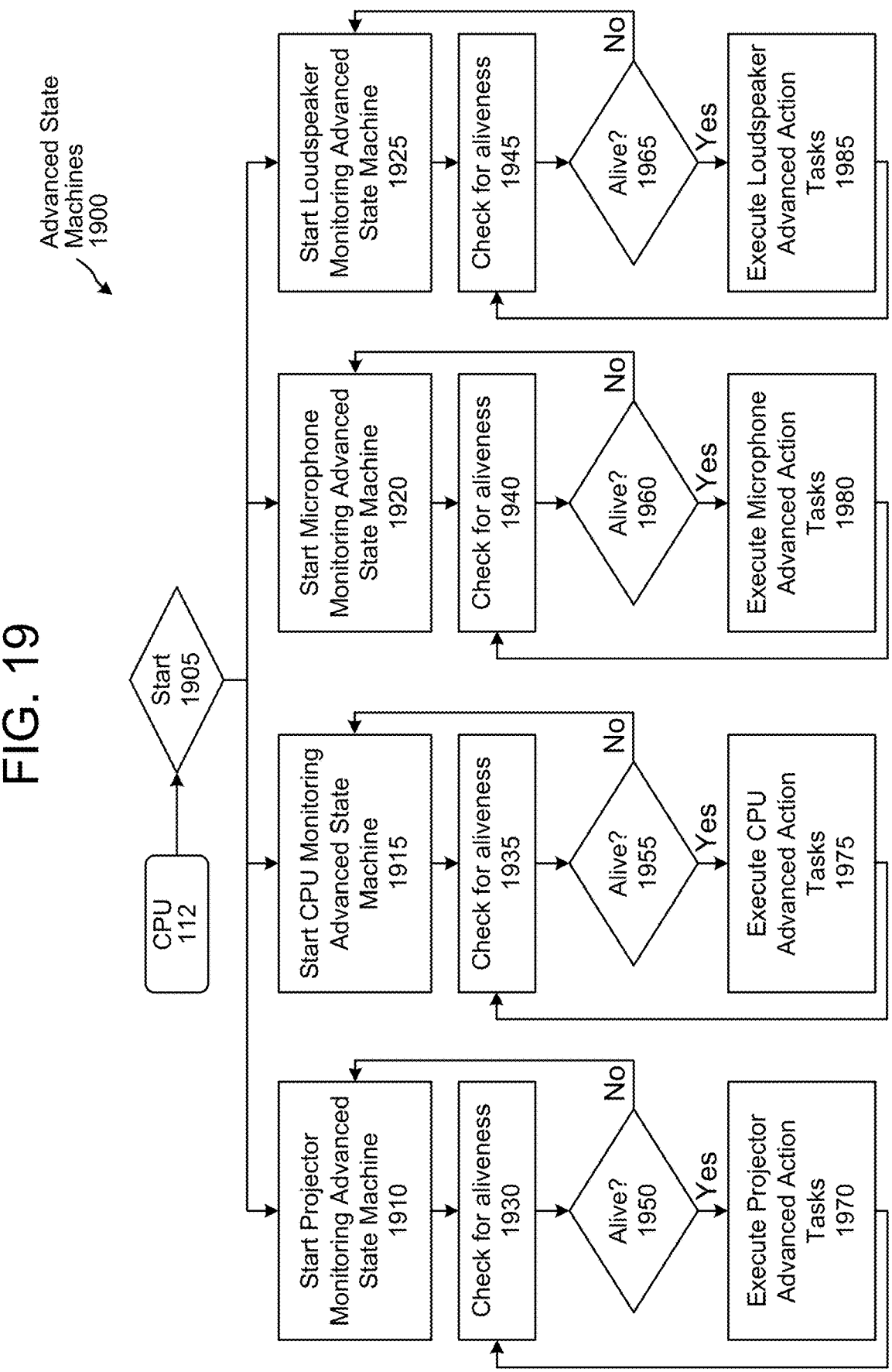
FIG. 19 is a conceptual diagram illustrating an example of advanced state machines according to embodiments of the present disclosure.

FIG. 19 is a conceptual diagram illustrating an example of advanced state machines according to embodiments of the present disclosure. FIG. 19 illustrates an example of advanced state machines 1900 associated with the CPU component 112. As illustrated in FIG. 19, the CPU component 112 may start (1905) normal operation (e.g., initialize) and then may start (1910) a projector monitoring advanced state machine, start (1915) a CPU monitoring advanced state machine, start (1920) a microphone monitoring advanced state machine, and start (1925) a loudspeaker monitoring advanced state machine, along with additional advanced state machines without departing from the disclosure.

After the CPU component 112 starts the advanced state machines 1900, the advanced state machines 1900 may control the peripheral components of the device 110 as long as the CPU component 112 continues to operate normally. For example, the projector monitoring advanced state machine may check (1930) for aliveness at a first predefined interval and determine (1950) whether the CPU component 112 is alive. In some examples, steps 1930 and 1950 may be inherent steps, such that the projector monitoring advanced state machine continues to operate as long as the CPU component 112 continues to operate. Thus, the projector monitoring advanced state machine may not explicitly perform steps 1930 and 1950 without departing from the disclosure. However, the disclosure is not limited thereto, and in other examples the projector monitoring advanced state machine may actively check to see whether the CPU component 112 is alive without departing from the disclosure. For example, the projector monitoring advanced state machine may determine whether the CPU component 112 set a first CPU-alive flag associated with the projector monitoring simple state machine described above with regard to FIG. 17.

If the CPU component 112 is alive and operating normally, the projector monitoring advanced state machine may execute (1970) projector advanced action tasks, as described in greater detail below with regard to FIG. 20, and may loop to step 1930 and continue to check for aliveness at the first predefined interval. If the CPU component 112 is not alive, indicating that the CPU component 112 is not operating normally (e.g., did not set the first CPU-alive flag for a duration of time and/or the like), the projector monitoring advanced state machine may loop to step 1910 and start the projector monitoring advanced state machine again (e.g., the CPU component 112 may restart the projector monitoring advanced state machine).

The CPU monitoring advanced state machine may check (1935) for aliveness at the first predefined interval and determine (1955) whether the CPU component 112 is alive. In some examples, steps 1935 and 1955 may be inherent steps, such that the CPU monitoring advanced state machine continues to operate as long as the CPU component 112 continues to operate. Thus, the CPU monitoring advanced state machine may not explicitly perform steps 1935 and 1955 without departing from the disclosure. However, the disclosure is not limited thereto, and in other examples the CPU monitoring advanced state machine may actively check to see whether the CPU component 112 is alive without departing from the disclosure. For example, the CPU monitoring advanced state machine may determine whether the CPU component 112 set a second CPU-alive flag associated with the CPU monitoring simple state machine described above with regard to FIG. 17.

If the CPU component 112 is alive and operating normally, the CPU monitoring advanced state machine may execute (1975) CPU advanced action tasks, as described in greater detail below with regard to FIG. 20, and then may loop to step 1935 and continue to check for aliveness at the first predefined interval. If the CPU component 112 is not alive, indicating that the CPU component 112 is not operating normally (e.g., did not set the second CPU-alive flag for a duration of time and/or the like), the CPU monitoring advanced state machine may loop to step 1915 and start the CPU monitoring advanced state machine again (e.g., the CPU component 112 may restart the CPU monitoring advanced state machine).

The microphone monitoring advanced state machine may check (1940) for aliveness at the first predefined interval and determine (1960) whether the CPU component 112 is alive. In some examples, steps 1940 and 1960 may be inherent steps, such that the microphone monitoring advanced state machine continues to operate as long as the CPU component 112 continues to operate. Thus, the microphone monitoring advanced state machine may not explicitly perform steps 1940 and 1960 without departing from the disclosure. However, the disclosure is not limited thereto, and in other examples the microphone monitoring advanced state machine may actively check to see whether the CPU component 112 is alive without departing from the disclosure. For example, the microphone monitoring advanced state machine may determine whether the CPU component 112 set a third CPU-alive flag associated with the microphone monitoring simple state machine described above with regard to FIG. 17.

If the CPU component 112 is alive and operating normally, the microphone monitoring advanced state machine may execute (1980) microphone advanced action tasks, as described in greater detail below with regard to FIG. 20, and then may loop to step 1940 and continue to check for aliveness at the first predefined interval. If the CPU component 112 is not alive, indicating that the CPU component 112 is not operating normally (e.g., did not set the third CPU-alive flag for a duration of time and/or the like), the microphone monitoring advanced state machine may loop to step 1920 and start the microphone monitoring advanced state machine again (e.g., the CPU component 112 may restart the microphone monitoring advanced state machine).

The loudspeaker monitoring advanced state machine may check (1945) for aliveness at the first predefined interval and determine (1965) whether the CPU component 112 is alive.

In some examples, steps 1945 and 1965 may be inherent steps, such that the loudspeaker monitoring advanced state machine continues to operate as long as the CPU component 112 continues to operate. Thus, the loudspeaker monitoring advanced state machine may not explicitly perform steps 1945 and 1965 without departing from the disclosure. However, the disclosure is not limited thereto, and in other examples the loudspeaker monitoring advanced state machine may actively check to see whether the CPU component 112 is alive without departing from the disclosure. For example, the loudspeaker monitoring advanced state machine may determine whether the CPU component 112 set a fourth CPU-alive flag associated with the loudspeaker monitoring simple state machine described above with regard to FIG. 17.

If the CPU component 112 is alive and operating normally, the loudspeaker monitoring advanced state machine may execute (1985) loudspeaker advanced action tasks, as described in greater detail below with regard to FIG. 20, and then may loop to step 1945 and continue to check for aliveness at the first predefined interval. If the CPU component 112 is not alive, indicating that the CPU component 112 is not operating normally (e.g., did not set the fourth CPU-alive flag for a duration of time and/or the like), the loudspeaker monitoring advanced state machine may loop to step 1925 and start the loudspeaker monitoring advanced state machine again (e.g., the CPU component 112 may restart the loudspeaker monitoring advanced state machine).

Figure 20:
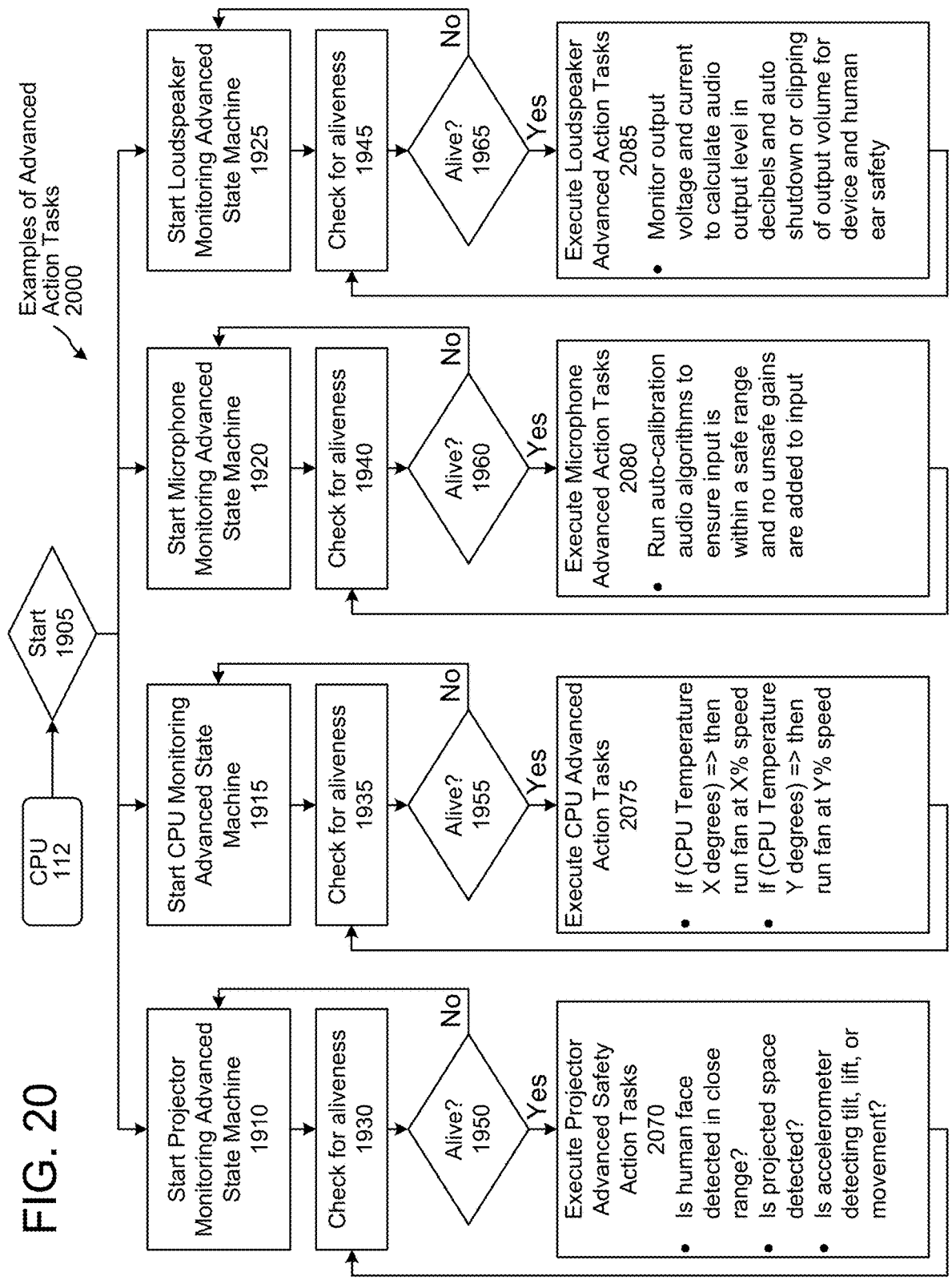
FIG. 20 is a conceptual diagram illustrating examples of executing advanced action tasks according to embodiments of the present disclosure.

FIG. 20 is a conceptual diagram illustrating examples of executing advanced action tasks according to embodiments of the present disclosure. FIG. 20 illustrates an example in which the advanced state machines 1900 operate as described above with regard to FIG. 19, except with additional details about the advanced action tasks performed by the advanced state machines 1900. Thus, FIG. 20 illustrates examples of advanced action tasks 2000 that are performed by the advanced state machines 1900 when the CPU component 112 is operating normally. As several components illustrated in FIG. 20 are described above with regard to FIG. 19, a redundant description is omitted.

As illustrated in FIG. 20, if the projector monitoring advanced state machine determines that the CPU is alive, indicating that the CPU component 112 is operating normally, the projector monitoring advanced state machine may execute (2070) projector advanced action tasks. For example, the projector monitoring advanced state machine may determine if a human face is detected in close range, may determine if the projected space 125 is detected, determine if an accelerometer detects tile, lift, or movement, and/or the like. If any of these conditions are satisfied, the projector monitoring advanced state machine may turn off the projector 116.

Similarly, if the CPU monitoring advanced state machine determines that the CPU is alive, indicating that the CPU component 112 is operating normally, the CPU monitoring advanced state machine may execute (2075) CPU advanced action tasks, such as setting a CPU cooling fan to a particular speed based on a temperature of the CPU component 112. For example, FIG. 20 illustrates an example in which the CPU monitoring advanced state machine determines that the CPU temperature is X degrees (e.g., determines a first temperature associated with the CPU component 112) and sets the fan speed at X % speed (e.g., sets the CPU cooling fan to a first speed corresponding to the first temperature), determines that the CPU temperature is Y degrees (e.g., determines a second temperature associated with the CPU component 112) and sets the fan speed at Y % speed (e.g., sets the CPU cooling fan to a second speed corresponding to the second temperature), and so on.

If the microphone monitoring advanced state machine determines that the CPU is alive, indicating that the CPU component 112 is operating normally, the microphone monitoring advanced state machine may execute (2080) microphone advanced action tasks. For example, the microphone monitoring advanced state machine may run auto-calibration audio algorithms to ensure that an input is within a safe range and no unsafe gains are added to the input.

If the loudspeaker monitoring advanced state machine determines that the CPU is alive, indicating that the CPU component 112 is operating normally, the loudspeaker monitoring advanced state machine may execute (2085) loudspeaker advanced action tasks. For example, the loudspeaker monitoring advanced state machine may monitor output voltage and current to calculate audio output level in decibels (dB) and perform audio shutdown or clipping of the output volume for device and human ear comfort.

Figure 21:
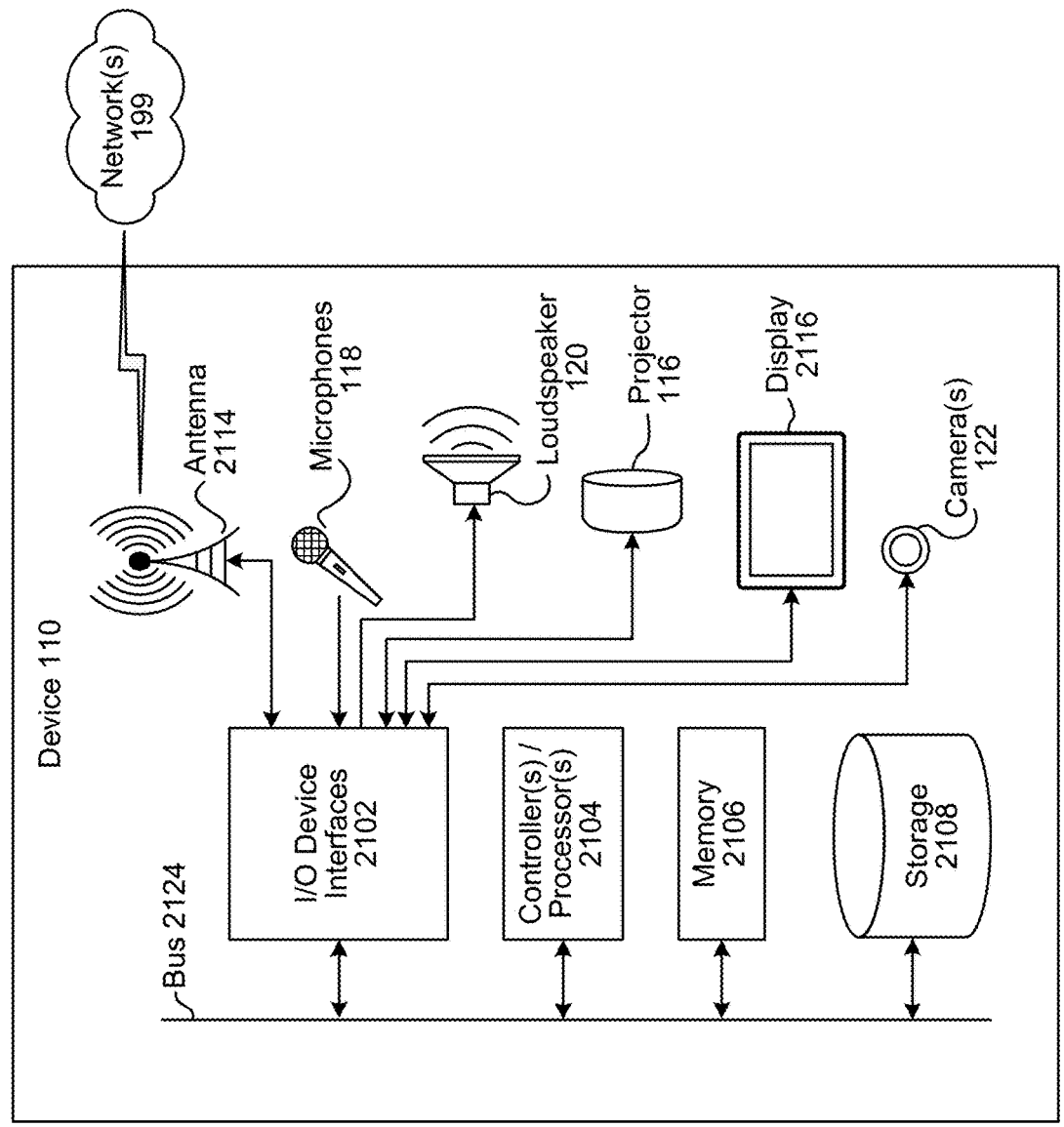
FIG. 21 is a block diagram conceptually illustrating example components of a device according to embodiments of the present disclosure.

FIG. 21 is a block diagram conceptually illustrating a device 110 that may be used with the system. Each device 110 may include one or more controllers/processors 2104, which may each include a central processing unit (CPU) for processing data and computer-readable instructions, and a memory 2106 for storing data and instructions of the respective device. The memories 2106 may individually include volatile random access memory (RAM), non-volatile read only memory (ROM), non-volatile magnetoresistive memory (MRAM), and/or other types of memory. Each device 110 may also include a data storage component 2108 for storing data and controller/processor-executable instructions. Each data storage component 2108 may individually include one or more non-volatile storage types such as magnetic storage, optical storage, solid-state storage, etc. Each device 110 may also be connected to removable or external non-volatile memory and/or storage (such as a removable memory card, memory key drive, networked storage, etc.) through respective input/output device interfaces 2102.

Computer instructions for operating each device 110 and its various components may be executed by the respective device's controller(s)/processor(s) 2104, using the memory 2106 as temporary "working" storage at runtime. A device's computer instructions may be stored in a non-transitory manner in non-volatile memory 2106, storage 2108, or an external device(s). Alternatively, some or all of the executable instructions may be embedded in hardware or firmware on the respective device in addition to or instead of software.

Each device 110 includes input/output device interfaces 2102. A variety of components may be connected through the input/output device interfaces 2102, as will be discussed further below. Additionally, each device 110 may include an address/data bus 2124 for conveying data among components of the respective device. Each component within a device 110 may also be directly connected to other components in addition to (or instead of) being connected to other components across the bus 2124.

Referring to FIG. 21, the device 110 may include input/output device interfaces 2102 that connect to a variety of components such as an audio output component such as a loudspeaker 120, a wired headset or a wireless headset (not illustrated), or other component capable of outputting audio. The device 110 may also include an audio capture component. The audio capture component may be, for example, microphones 118 or an array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a projector 116 for projecting content and/or a display 2116 for displaying content. The device 110 may further include a camera 2118.

Via antenna(s) 2114, the input/output device interfaces 2102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface 2102 may also include communication components that allow data to be exchanged between devices such as different physical servers in a collection of servers or other components.

The components of the device 110 may include their own dedicated processors, memory, and/or storage. Alternatively, one or more of the components of the device 110 may utilize the I/O interfaces 2102, processor(s) 2104, memory 2106, and/or storage 2108 of the device(s) 110.

As noted above, multiple devices may be employed in a single system. In such a multi-device system, each of the devices may include different components for performing different aspects of the system's processing. The multiple devices may include overlapping components. The components of the device 110 as described herein, are illustrative, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving, by a first device, first audio data from a second device, the first audio data including a representation of remote speech;
   receiving, by the first device, first image data from the second device;
   generating, using a loudspeaker of the first device, output audio using the first audio data;
   generating, using a projector of the first device, an output image using the first image data;
   generating, using two or more microphones of the first device, second audio data;
   generating, using a camera of the first device, second image data;
   sending, by the first device, the second audio data to the second device;
   sending, by the first device, the second image data to the second device;
   generating, using a reference microphone of the first device, third audio data;
   processing the third audio data to determine that the third audio data represents local speech;
   determining a first signal strength value associated with the third audio data;
   determining that the first signal strength value exceeds a threshold value indicating a user is within a certain position relative to the projector; and
   in response to determining that the third audio data represents local speech and the first signal strength value exceeds the threshold value, turning off the projector.

2. The computer-implemented method of claim 1, further comprising:
performing audio beamforming using the second audio data to determine that the local speech corresponds to a first direction relative to the two or more microphones;
determining that the projector is in the first direction relative to the two or more microphones;
determining a second signal strength value associated with the second audio data; and
using the second signal strength value as the threshold value.

3. The computer-implemented method of claim 1, further comprising:
turning on the projector;
generating, using the reference microphone, fourth audio data;
processing the fourth audio data to determine that the fourth audio data does not include a representation of speech;
processing the fourth audio data to determine that the fourth audio data includes a representation of breathing;
determining a second signal strength value associated with the fourth audio data;
determining that the second signal strength value exceeds the threshold value; and
in response to determining that the fourth audio data includes the representation of breathing and the second signal strength value exceeds the threshold value, turning off the projector.

4. The computer-implemented method of claim 1, wherein:
processing the third audio data to determine that the third audio data represents local speech further comprises processing the third audio data using a first processor component of the first device; and
wherein the method further comprises, prior to receiving the first audio data:
initiating, by a second processor component, a first state machine associated with the projector;
operating, by the second processor component, in a first mode, the first state machine configured as a primary state machine for the projector while the second processor component is operating in the first mode;
initiating, by the first processor component, a second state machine associated with the projector; and
operating, by the first processor component, in a second mode, the second state machine configured as a secondary state machine for the projector while the first processor component is operating in the second mode.

5. A computer-implemented method, the method comprising:
receiving, by a first device, first image data from a second device;
generating, using a projector of the first device, an output image using the first image data;
generating, using at least a first microphone of the first device, first audio data;
sending, by the first device, the first audio data to the second device;
generating, using a second microphone of the first device, second audio data;
determining that the second audio data satisfies a condition; and
in response to determining that the second audio data satisfies the condition, turning off the projector.

6. The computer-implemented method of claim 5, wherein determining that the second audio data satisfies the condition further comprises:
determining that voice activity is represented by the second audio data;
determining a first signal strength value associated with the second audio data; and
determining that the first signal strength value exceeds a threshold value.

7. The computer-implemented method of claim 5, wherein determining that the second audio data satisfies the condition further comprises:
determining that voice activity is represented by the second audio data;
determining a first signal strength value associated with the second audio data;
determining a second signal strength value associated with the first audio data; and
determining that the first signal strength value exceeds the second signal strength value.

8. The computer-implemented method of claim 5, wherein determining that the second audio data satisfies the condition further comprises:
generating directional audio data using the first audio data, the directional audio data associated with a first direction relative to the first microphone and including a representation of an audible sound;
determining that the projector is in the first direction relative to the first microphone;
determining that voice activity is represented by the second audio data;
determining a first signal strength value associated with the second audio data;
determining a second signal strength value associated with the directional audio data; and
determining that the first signal strength value exceeds the second signal strength value.

9. The computer-implemented method of claim 5, wherein determining that the second audio data satisfies the condition further comprises:
isolating a portion of the second audio data that is associated with a frequency range;
detecting breathing is represented in the portion of the second audio data;
determining a first signal strength value associated with the portion of the second audio data; and
determining that the first signal strength value exceeds a threshold value.

10. The computer-implemented method of claim 5, further comprising:
initiating, by a first processor component of the first device, a primary state machine associated with the projector; and
initiating, by a second processor component of the first device, a secondary state machine associated with the projector,
wherein determining that the second audio data satisfies the condition further comprises:
determining, by the second processor component, a signal strength value associated with the second audio data, and
determining that the signal strength value is greater than a first value.

11. The computer-implemented method of claim 5, further comprising:
  initiating, by a first processor component, a first state machine associated with projector;
  operating, by the first processor component, in a first mode, the first state machine configured as a primary state machine for the projector while the first processor component is operating in the first mode;
  initiating, by a second processor component, a second state machine associated with the projector; and
  operating, by the second processor component, in a second mode, the second state machine configured as a secondary state machine for the projector while the second processor component is operating in the second mode.

12. The computer-implemented method of claim 5, further comprising:
  turning on the projector;
  receiving, by a first processor component of the first device, a first indication that a second processor component of the first device is operating in a first mode;
  determining that a duration of time has elapsed since the first indication was received, indicating that the second processor component is operating in a second mode;
  in response to determining that the duration of time has elapsed, operating the first processor component in a third mode, the first processor component configured to control the projector in the third mode; and
  turning off the projector by the first processor component.

13. A system comprising:
  at least one processor; and
  memory including instructions operable to be executed by the at least one processor to cause the system to:
    receive, by a first device, first image data from a second device;
    generate, using a projector of the first device, an output image using the first image data;
    generate, using at least a first microphone of the first device, first audio data;
    send, by the first device, the first audio data to the second device;
    generate, using a second microphone of the first device, second audio data;
    determine that the second audio data satisfies a condition; and
    in response to determining that the second audio data satisfies the condition, turn off the projector.

14. The system of claim 13, wherein the memory further comprises instructions that, when executed by the at least one processor, further cause the system to:
  determine that voice activity is represented by the second audio data;
  determine a first signal strength value associated with the second audio data; and
  determine that the first signal strength value exceeds a threshold value.

15. The system of claim 13, wherein the memory further comprises instructions that, when executed by the at least one processor, further cause the system to:
  determine that voice activity is represented by the second audio data;
  determine a first signal strength value associated with the second audio data;
  determine a second signal strength value associated with the first audio data; and
  determine that the first signal strength value exceeds the second signal strength value.

16. The system of claim 13, wherein the memory further comprises instructions that, when executed by the at least one processor, further cause the system to:
  generate directional audio data using the first audio data, the directional audio data associated with a first direction relative to the first microphone and including a representation of an audible sound;
  determine that the projector is in the first direction relative to the first microphone;
  determine that voice activity is represented by the second audio data;
  determine a first signal strength value associated with the second audio data;
  determine a second signal strength value associated with the directional audio data; and
  determine that the first signal strength value exceeds the second signal strength value.

17. The system of claim 13, wherein the memory further comprises instructions that, when executed by the at least one processor, further cause the system to:
  isolate a portion of the second audio data that is associated with a frequency range;
  detect breathing is represented in the portion of the second audio data;
  determine a first signal strength value associated with the portion of the second audio data; and
  determine that the first signal strength value exceeds a threshold value.

18. The system of claim 13, wherein the memory further comprises instructions that, when executed by the at least one processor, further cause the system to:
  initiate, by a first processor component of the first device, a primary state machine associated with the projector;
  initiate, by a second processor component of the first device, a secondary state machine associated with the projector;
  determine, by the second processor component, a signal strength value associated with the second audio data;
  determine that the signal strength value is greater than a first value; and
  in response to determining that the signal strength value is greater than the first value, determine that the second audio data satisfies the condition.

19. The system of claim 13, wherein the memory further comprises instructions that, when executed by the at least one processor, further cause the system to:
  initiate, by a first processor component, a first state machine associated with projector;
  operate, by the first processor component, in a first mode, the first state machine configured as a primary state machine for the projector while the first processor component is operating in the first mode;
  initiate, by a second processor component, a second state machine associated with the projector; and
  operate, by the second processor component, in a second mode, the second state machine configured as a secondary state machine for the projector while the second processor component is operating in the second mode.

20. The system of claim 13, wherein the memory further comprises instructions that, when executed by the at least one processor, further cause the system to:
  turn on the projector;
  receive, by a first processor component of the first device, a first indication that a second processor component of the first device is operating in a first mode;

determine that a duration of time has elapsed since the first indication was received, indicating that the second processor component is operating in a second mode;

in response to determining that the duration of time has elapsed, operate the first processor component in a third mode, the first processor component configured to control the projector in the third mode; and turn off the projector by the first processor component.

\* \* \* \* \*